United States Patent
Kondo

(10) Patent No.: US 9,031,324 B2
(45) Date of Patent: May 12, 2015

(54) IMAGE-PROCESSING DEVICE SPECIFYING ENCIRCLING LINE FOR IDENTIFYING SUB-REGION OF IMAGE

(71) Applicant: Masaki Kondo, Toyoake (JP)

(72) Inventor: Masaki Kondo, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/219,169

(22) Filed: Mar. 19, 2014

(65) Prior Publication Data

US 2014/0286572 A1   Sep. 25, 2014

(30) Foreign Application Priority Data

Mar. 19, 2013   (JP) ................................. 2013-057043

(51) Int. Cl.
   *G06K 9/34*    (2006.01)
   *G06K 9/00*    (2006.01)

(52) U.S. Cl.
   CPC ................................. *G06K 9/00536* (2013.01)

(58) Field of Classification Search
   None
   See application file for complete search history.

(56) References Cited

U.S. PATENT DOCUMENTS

| | | | | |
|---|---|---|---|---|
| 5,029,224 A | * | 7/1991 | Fujisawa | 382/175 |
| 5,048,099 A | * | 9/1991 | Lee | 382/175 |
| 5,201,011 A | * | 4/1993 | Bloomberg et al. | 382/175 |
| 5,339,365 A | * | 8/1994 | Kawai et al. | 382/176 |
| 5,497,432 A | * | 3/1996 | Nishida | 382/178 |
| 6,674,900 B1 | * | 1/2004 | Ma et al. | 382/176 |
| 2014/0285861 A1 | * | 9/2014 | Kondo | 358/538 |
| 2014/0286572 A1 | * | 9/2014 | Kondo | 382/175 |
| 2014/0293383 A1 | * | 10/2014 | Ozawa | 358/538 |

FOREIGN PATENT DOCUMENTS

| | | |
|---|---|---|
| JP | H06-076114 A | 3/1994 |
| JP | H07-092651 A | 4/1995 |

OTHER PUBLICATIONS

Co-pending U.S. Appl. No. 14/219,127, filed Mar. 19, 2014.

* cited by examiner

*Primary Examiner* — Andrae S Allison
(74) *Attorney, Agent, or Firm* — Banner & Witcoff, Ltd.

(57) ABSTRACT

An image-processing device stores computer-readable instructions therein. The computer-readable instructions, when executed by a processor, cause the image-processing device to perform identifying an object in a target image represented by target image data. The object includes object pixels. The processor further performs setting frame regions for the object pixels and counting an intersection number. The partial object region is positioned within frame regions and has object pixels consecutively arranged. The processor performs calculating a ratio of first object pixels to the object pixels as a first ratio. Each first object pixel is an object pixel whose intersection number is 2. The processor performs judging whether the first ratio is greater than or equal to a first reference value and determining that the object is an encircling line that encloses a part of the target image if the first ratio is greater than or equal to the first reference value.

10 Claims, 13 Drawing Sheets

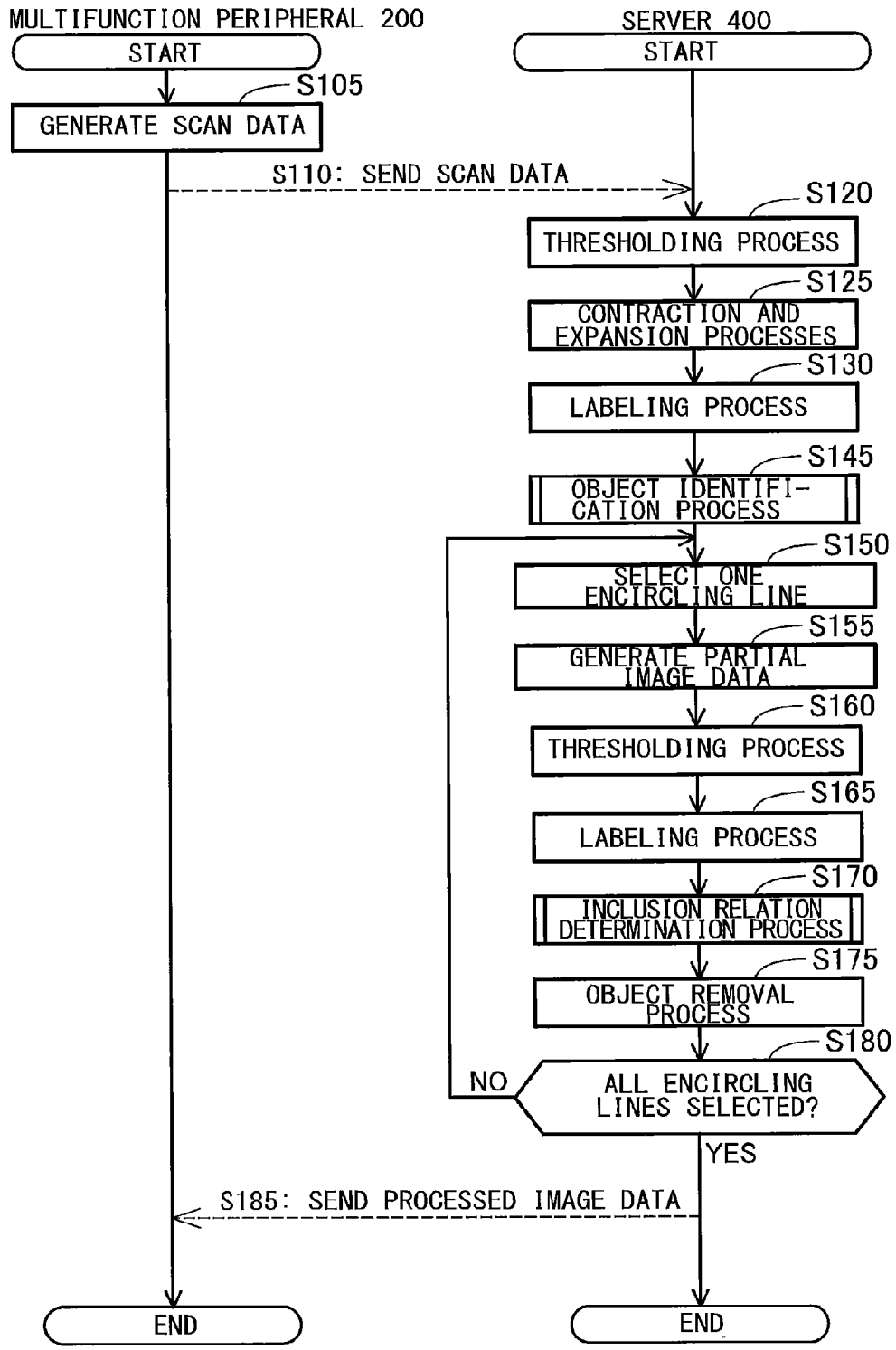

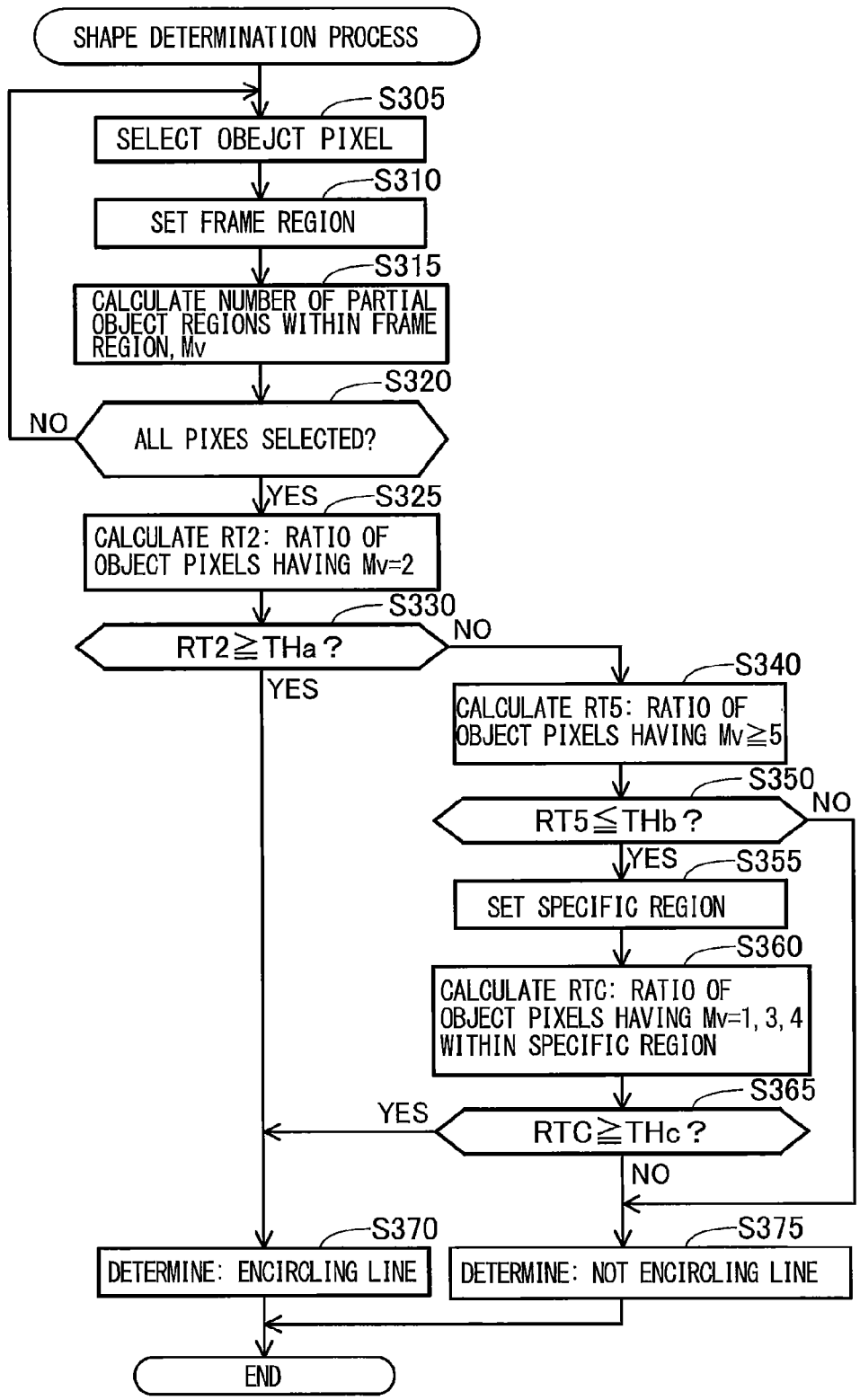

FIG. 8A
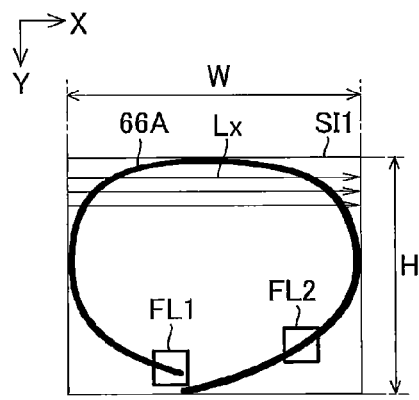
FIG. 8B
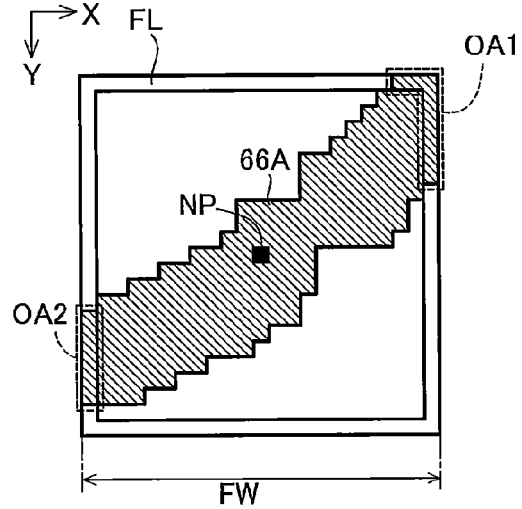
FIG. 8C
FW = 2 × [{55 × RS／300} × {LW/10} × {OBS/720}] +1
FW : WIDTH OF SPECIFIC REGION
RS : RESOLUTION
LW : LINE WIDTH
OBS: OBJECT SIZE $EW = 2 \times [\{100 \times RS / 300\} \times \{LW/10\} \times \{OBS/720\}] + 1$

EW : WIDTH OF SPECIFIC REGION
RS : RESOLUTION
LW : LINE WIDTH
OBS: OBJECT SIZE

IMAGE-PROCESSING DEVICE SPECIFYING ENCIRCLING LINE FOR IDENTIFYING SUB-REGION OF IMAGE

CROSS REFERENCE TO RELATED APPLICATION

This application claims priority from Japanese Patent Application No. 2013-057043 filed Mar. 19, 2013. The entire content of the priority application is incorporated herein by reference.

TECHNICAL FIELD

The present invention relates to an image-processing device and a computer program that employ encircling lines for identifying sub-regions of an image.

BACKGROUND

In image processes performed on image data there are known techniques for identifying prescribed objects in an image represented by the image data. One image-processing technique known in the art identifies the outlines of objects in an image according to algorithms based on differences in color and density, and instructions from an operator indicating reference points in the image.

SUMMARY

Image processing is useful for identifying an encircling line in an image that surrounds a partial region of the image. For example, if an encircling line is used for specifying a partial region in an image, an image-processing device can recognize the specified region by identifying the encircling line through image processing.

In view of the foregoing, it is an object of the present invention to provide a new technique of image processing capable of appropriately identifying an encircling line in an image surrounding a partial region of the image.

In order to attain the above and other objects, the invention provides an image-processing device including a processor and a memory storing computer-readable instructions therein. The computer-readable instructions, when executed by the processor, cause the image-processing device to perform identifying an object in a target image represented by target image data. The object includes a plurality of object pixels. The image-processing device further cause the processor to perform executing the following steps (A), (B), (C) and (D) for each of the plurality of object pixels included in the object; (A) identifying, as a target pixel, each of the plurality of object pixels the included in the object, the target pixel being one of the plurality of object pixels representing the first value; (B) setting a frame region for the target pixel, the frame region surrounding the target pixel or including a plurality of pixels including the target pixel; (C) identifying a partial object region corresponding to the target pixel, the partial object region being a part of the frame region and having at least one of the plurality of object pixels representing the first value; and (D) counting a number of the partial object regions included in the frame region. The image-processing device further cause the processor to perform calculating a ratio of first object pixels to the plurality of object pixels as a first ratio. The number of the partial object regions that correspond to the each of the first object pixels is 2. The image-processing device further cause the processor to perform judging whether the first ratio is greater than or equal to a first reference value, and determining that the object represents an encircling line that encloses a part of the target image if the first ratio is greater than or equal to the first reference value.

According to another aspect, the present invention provides a non-transitory computer readable storage medium storing a set of program instructions installed on and executed by a computer. The program instructions include identifying an object in a target image represented by target image data. The object includes a plurality of object pixels. The program instructions further include executing the following steps (A), (B), (C) and (D) for each of the plurality of object pixels included in the object; (A) identifying, as a target pixel, each of the plurality of object pixels the included in the object, the target pixel being one of the plurality of object pixels representing the first value; (B) setting a frame region for the target pixel, the frame region surrounding the target pixel or including a plurality of pixels including the target pixel; (C) identifying a partial object region corresponding to the target pixel, the partial object region being a part of the frame region and having at least one of the plurality of object pixels representing the first value; and (D) counting a number of the partial object regions included in the frame region. The program instructions further include calculating a ratio of first object pixels to the plurality of object pixels as a first ratio. The number of the partial object regions that correspond to the each of the first object pixels is 2. The program instructions further include judging whether the first ratio is greater than or equal to a first reference value, and determining that the object represents an encircling line that encloses a part of the target image if the first ratio is greater than or equal to the first reference value.

BRIEF DESCRIPTION OF THE DRAWINGS

In the drawings:

FIG. 2 is a flowchart illustrating operations of the image-processing system;

FIG. 7 is a flowchart illustrating steps in a shape determination process according to the embodiment;

FIG. 8A shows explanatory diagram for the shape determination process;

FIG. 8B shows an example of a frame region that is set for a target pixel;

FIG. 8C shows an equation expressing a width of the frame region;

DETAILED DESCRIPTION

A. First Embodiment

A-1: Structure of an Image-Processing System

Figure 1:
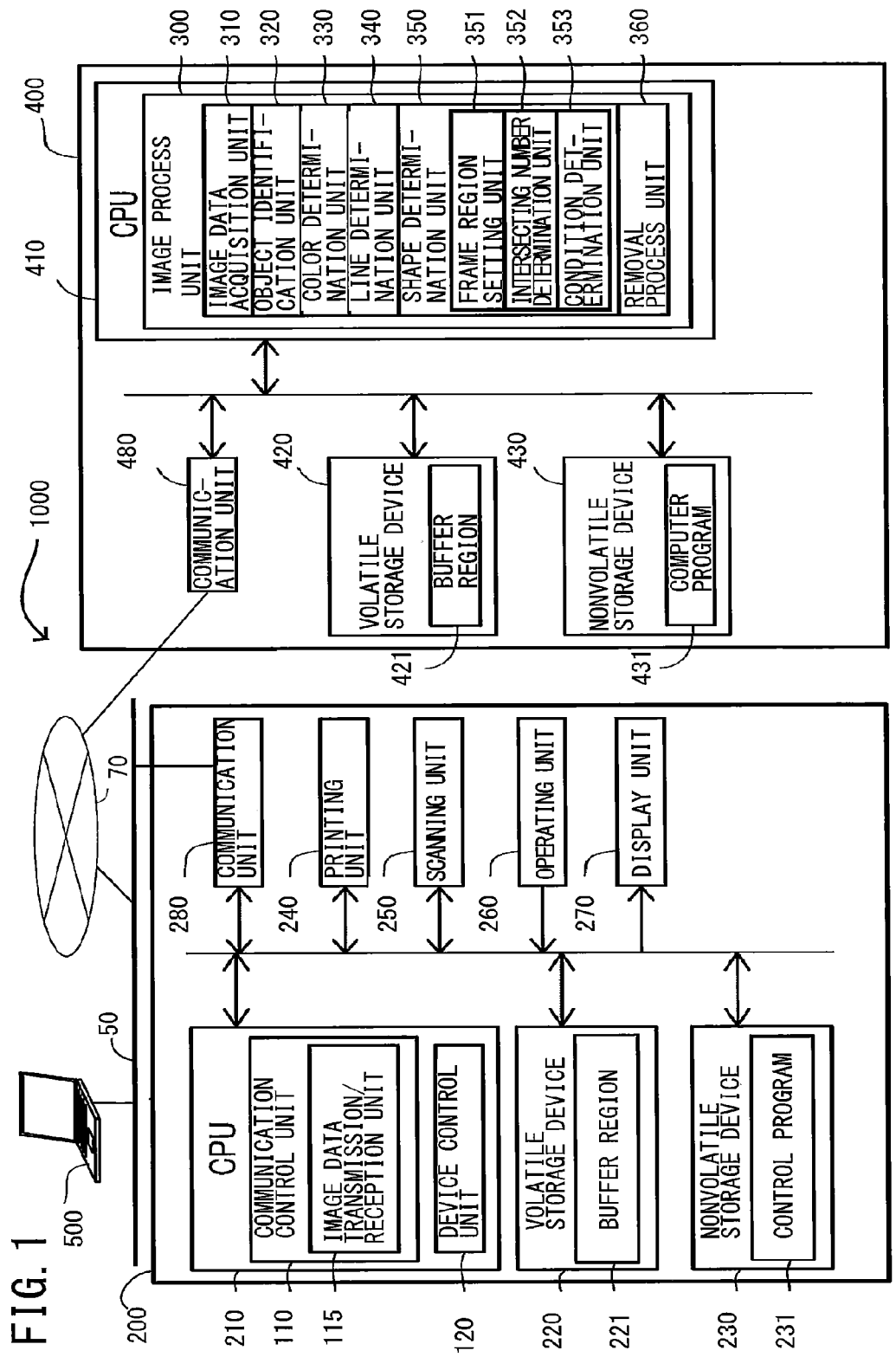
FIG. 1 is a block diagram showing the structure of an image-processing system according to an embodiment of the present invention.

FIG. 1 is a block diagram showing the structure of an image-processing system 1000 according to a first embodiment of the present invention. The image-processing system 1000 is configured of a server 400 functioning as an image processor, and a multifunction peripheral 200. The server 400 is connected to an internet 70. The multifunction peripheral 200 is also connected to the internet 70 via a local area network (LAN) 50. Consequently, the server 400 and multifunction peripheral 200 can communicate with each other via the LAN 50 and internet 70. Further, a personal computer 500 possessed by the user of the multifunction peripheral 200 may be connected to the LAN 50.

The server 400 includes a CPU 410; a volatile storage device 420, such as DRAM; a nonvolatile storage device 430, such as flash memory or a hard disk drive; and a communication unit 480 including an interface for connecting to an internet 70. The volatile storage device 420 has a buffer region 421 to store temporary data generated by process of a CPU 410. The nonvolatile storage device 430 includes a computer program 431 that executes image processes (described later) employing the CPU 410. The computer program 431 may be provided by various media, such as a DVD-ROM.

By executing the computer program 431, the CPU 410 functions as an image process unit 300. The image process unit 300 includes an image data acquisition unit 310 for acquiring image data to be processed (hereinafter called "target image data"), an object identification unit 320 for identifying objects in a target image represented by target image data, three determination units 330-350 for determining whether an object is an encircling line when the object meets prescribed determination conditions, and a removal process unit 360 that executes a process to remove an object enclosed in an encircling line. As will be described later, an encircling line is a line that encloses a partial region of a target image, such as a region depicting a specific object or a background region that includes no objects. An encircling line may be drawn on an original in a red colored pen, for example, so that image data obtained when the original is scanned (hereinafter called "scan data") represents the encircling line on the image.

The determination units 330-350 function to determine whether first, second, and third determination conditions are satisfied. The determination units 330-350 specifically include a color determination unit 330 for determining whether an object is monochromatic (the first determination condition), a line determination unit 340 for determining whether an object is a line (the second determination condition), and a shape determination unit 350 for determining whether the object has a shape for encircling a region (the third determination condition). In the first embodiment, the image process unit 300 determines that a target object is an encircling line when the object satisfies all three determination conditions. The shape determination unit 350 further includes a frame region setting unit 351, an intersection number determination unit 352, and a condition determination unit 353. An image process performed by these functional units will be described later in detail.

The multifunction peripheral 200 includes a CPU 210; a volatile storage device 220, such as a DRAM; nonvolatile storage device 230, such as a flash memory or a hard disk drive; a printing unit 240; a scanning unit 250; an operating unit 260, such as a touch panel or buttons; a display unit 270, such as a LCD; and a communication unit 280 including an interface for connecting to a network, such as a LAN 50.

The volatile storage device 220 is provided with a buffer region 221 for temporarily storing various data generated when the CPU 210 performs processes. The nonvolatile storage device 230 stores a control program 231.

The printing unit 240 executes printing operations according to an inkjet or laser printing method, for example. The scanning unit 250 produces scan data by reading an original using a photoelectric converting element (CCD or CMOS, for example). Scan data is bitmap data representing colors in red (R), green (G), and blue (B) color component values (256-level gradation values in the first embodiment), for example. Hereinafter, red, green, and blue color component values will be respectively called the R component value, G component value, and B component value.

By executing the control program 231, the CPU 210 functions as a communication control unit 110, and a device control unit 120. The device control unit 120 controls the printing unit 240 and scanning unit 250 to execute a copy process, print process, and scan process, for example. The communication control unit 110 is a functional unit that controls communications with an external device. More specifically, the communication control unit 110 is provided with an image data transmission/reception unit 115 for exchanging image data with the server 400 during an image process described later.

A-1: Operations of the Image-Processing System

The image process unit 300 of the server 400 executes an image process on target image data to generate processed image data. The operations of the image-processing system 1000 executed to implement this image process will be described next.

FIG. 2 is a flowchart illustrating the operations of the image-processing system 1000. The image-processing system 1000 executes the process in this flowchart when the multifunction peripheral 200 receives an instruction for a specific operating mode and a read command for an original SC from the user. The specific operating mode in the first embodiment is a mode in which the image-processing system 1000 generates image data from an original SC representing the image on the original SC, excluding specified objects enclosed in encircling lines. The specific operating mode will be called the "specified object removal mode."

In S105 at the beginning of the process in FIG. 2, the device control unit 120 (see FIG. 1) of the multifunction peripheral 200 controls the scanning unit 250 to scan an original SC in order to generate scan data.

Figure 3A:
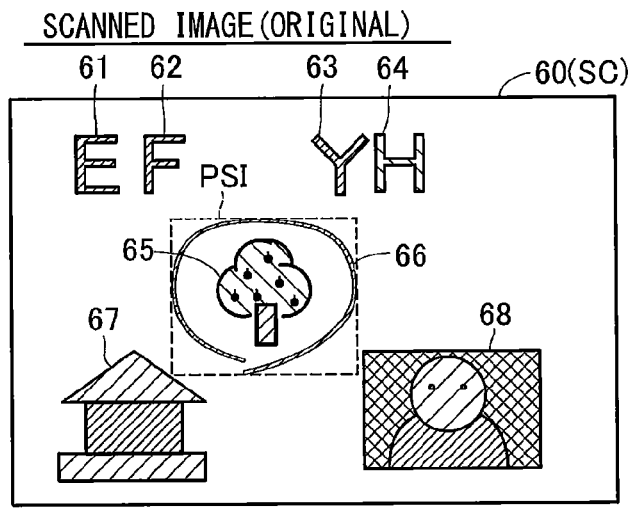
FIG. 3A shows a sample scanned image represented by scan data.
Figure 3B:
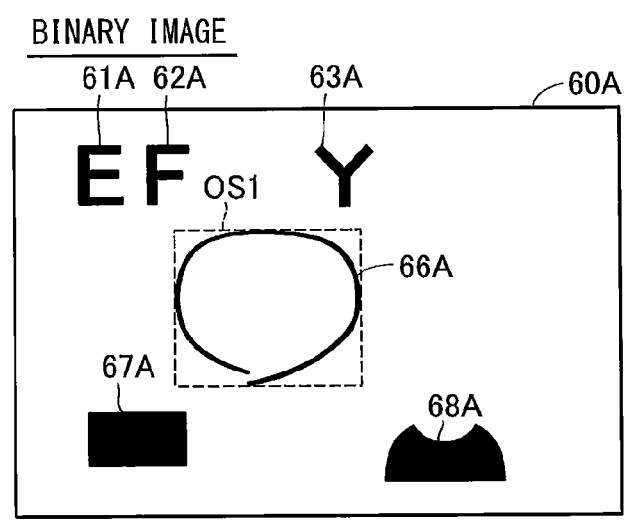
FIG. 3B shows an example of a binary image of the scan data.

FIGS. 3A and 3B show an example of an original and its images. FIG. 3A shows a sample scanned image 60 represented by scan data. Since the scanned image 60 is an image representing an original SC, FIG. 3A can also be called a drawing showing an example of an original SC.

The scanned image 60 (the original SC) has various objects including four characters 61-64, two drawings 65 and 67, one photo 68, and an encircling line 66. A drawing is an object that represents an illustration, table, graph, diagram, vector art, pattern, or the like. The encircling line 66 is an object that the user has handwritten on the original SC using a pen in a preset color (red, in the first embodiment) and is used in the specified object removal mode. The user draws the encircling line by hand on the original SC to indicate an object that the user wishes to remove. In the example of FIG. 3A, the encircling line 66 encircles the drawing 65. Note that three of the characters (i.e., the characters 61-63) are depicted in red, while one character (the character 64) is not depicted in red. The drawing 65 does not include any red parts, but the drawing 67 and the photo 68 do include red parts.

In S110 of FIG. 2, the image data transmission/reception unit 115 (see FIG. 1) of the server 400 transmits the scan data generated in S105 to the server 400. The image data transmission/reception unit 115 compresses the scan data (e.g. according to the JPEG compression format) before transmitting the data to the server 400, for example. As a result of the process in S110, the image data acquisition unit 310 of the image process unit 300 provided in the server 400 acquires scan data from the multifunction peripheral 200 as target image data.

Upon acquiring this scan data, the image process unit 300 executes a series of processes for identifying encircling lines in the scanned image 60 (steps S120-S145).

In S120, the object identification unit 320 generates binary image data through a thresholding process on the scan data. Specifically, the object identification unit 320 classifies each of the pixels in the scan data as either a pixel having a color value that specifies the color of the encircling line (red object pixel) or a pixel possessing a color value specifying another color (non-red pixel). Since the color of the encircling line is assumed to be red in the first embodiment, the encircling line color range may be set to a range of colors in which the R component value is at least a red reference value Rth, the G component value is no greater than a green reference value Gth, and the B component value is no greater than a blue reference value Bth. For example, pixels having color values that fall within the encircling line color range (the B component is at least the Rth, the G component is less than or equal to the Gth, and the B component is less than or equal to the Bth) are classified as red object pixels, while pixels having color values outside the encircling line color range (the B component less than the Rth, the G component is greater than the Gth, or the B component is greater than the Bth) are classified as non-red pixels. Note that the encircling line color may be set to a color other than red, and the encircling line color range may be set to a partial color range that includes the color anticipated to be the color of the encircling line.

FIG. 3B is a schematic diagram showing an example of a binary image 60A represented by the binary image data. The binary image 60A includes separate red objects: three characters 61A-63A, an encircling line 66A, and partial objects 67A and 68A as part of the photo 68 and a drawing 67 (see FIG. 3A). Note that the character 64 and the drawing 65 (FIG. 3A) are not shown as red objects in the binary image 60A, since the character 64 and the drawing 65 are not red colored.

In S125, the object identification unit 320 executes contraction and expansion processes on the binary image data for contracting and expanding the red objects. In the first embodiment, the contraction process is firstly executed resulting in the generation of contracted binary image data, and consecutively the expansion process is carried out on the contracted binary image data.

Figure 4A:
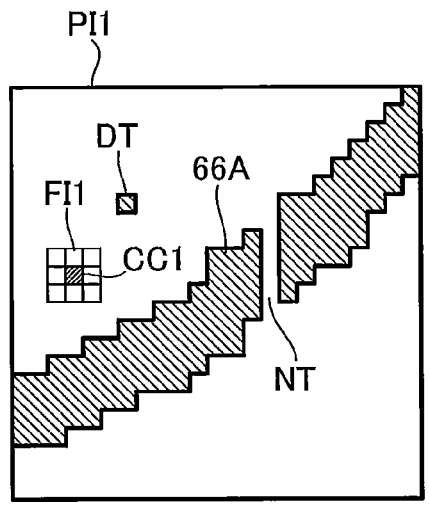
FIG. 4A shows a partial image of the binary image shown in FIG. 3B.
Figure 4B:
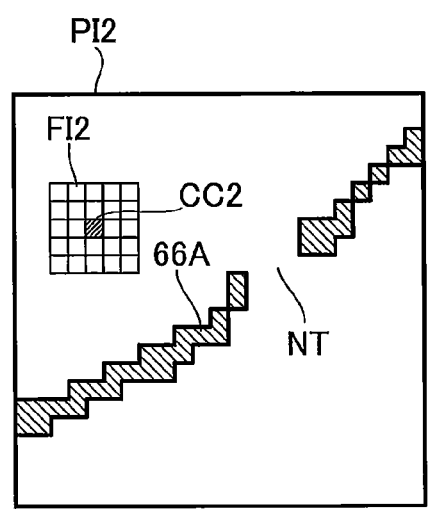
FIG. 4B shows a contracted partial image of a contracted binary image.
Figure 4C:
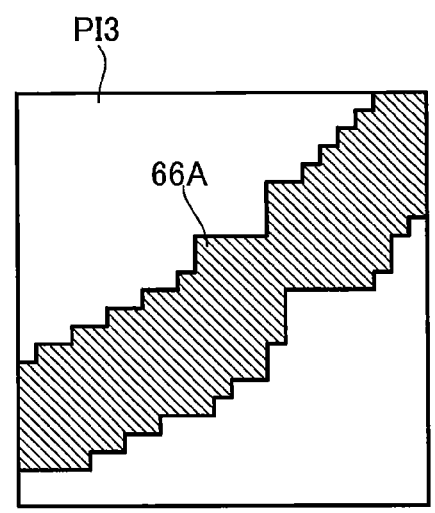
FIG. 4C shows an expanded partial image within an expanded binary image.

FIGS. 4A-4C is an explanatory diagram illustrating contraction and expansion processes. FIG. 4A shows a partial image PI1 from the binary image 60A shown in FIG. 3B. The partial image PI1 includes a portion of the encircling line 66A, serving as an example of a red-colored object that has yet undergone the contraction process, and a noise pixel DT. The noise pixel DT is an isolated pixel. The isolated noise pixel DT is a red object pixel that appears in the binary image 60A due to noise in the scanned image 60 and does not constitute a specified red object. The encircling line 66A may also include a discontinuous part (hereinafter called a disconnected part NT). A disconnected part NT may appear in the encircling line 66A of the binary image 60A when the encircling line 66 of the scanned image 60 has a relatively light portion or a relatively thin portion, for example.

The contraction process is executed using a filter of a prescribed size. In the example of FIG. 4A, a 3×3 (three rows by three columns) filter FI1 is used for the contraction process. The object identification unit 320 generates contracted binary image data by applying the filter FI1 to the binary image data representing the binary image 60A. In other words, the object identification unit 320 arranges the filter FI1 over the binary image 60A so that a center position CC1 of the filter FI1 (see FIG. 4A) overlaps the target pixel. If even one non-red pixel is present in the range of the filter FI1, the object identification unit 320 sets the pixel in the binary image corresponding to the target pixel to a non-red pixel. If there are no non-red pixels within the range of the filter FI1, i.e., when all nine pixels in the filter FI1 are red object pixels, the object identification unit 320 sets the pixel in the contracted binary image corresponding to the target pixel to a red object pixel. By selecting each pixel in the binary image 60A to be the target pixel and setting the corresponding pixel in the contracted binary image to either a non-red pixel or a red object pixel, the object identification unit 320 generates contracted binary image data representing the contracted binary image. In this way, the contraction process for contracting red objects is also clearly a process for expanding the regions configured of non-red objects (primarily the background region).

FIG. 4B shows a contracted partial image PI2 of the contracted binary image that corresponds to the partial image PI1 in FIG. 4A. As shown in FIG. 4B, the noise pixel DT no longer appears in the contracted partial image PI2. Thus, the contraction process can eliminate isolated red object pixels, such as the noise pixel DT. In addition, red objects such as the encircling line 66A in the contracted partial image PI2 are thinner (contracted) compared to the same object prior to contraction, as with the encircling line 66A in the partial image PI1. At the same time, the disconnected part NT of the encircling line 66A is larger in the contracted partial image PI2 than the disconnected part NT formed in the encircling line 66A of the partial image PI1.

Next, the expansion process is executed using a filter of a prescribed size. In the example of FIG. 4B, a 5×5 (five rows by five columns) filter FI2 is used in the expansion process. The object identification unit 320 generates expanded binary image data by applying the filter FI2 to the contracted binary image data representing the contracted binary image. That is, the object identification unit 320 arranges the filter FI2 over the contracted binary image so that a center position CC2 of the filter FI2 (see FIG. 4B) overlaps the target pixel. When even one red object pixel is present within the range of the filter FI2, the object identification unit 320 sets the pixel in an expanded binary image corresponding to the target pixel to a red object pixel. If no red object pixel is present within the range of the filter FI2, i.e., when all 25 pixels within the range of the filter FI2 are non-red pixels, the object identification unit 320 sets the pixel in the expanded binary image that corresponds to the target pixel to a non-red pixel. By selecting each pixel in the contracted binary image as the target pixel and setting the corresponding pixel in the expanded binary image to either a non-red pixel or a red object pixel, the object identification unit 320 generates expanded binary image data representing an expanded binary image.

FIG. 4C shows an expanded partial image PI3 within the expanded binary image that corresponds to the partial image PI1 and the contracted partial image PI2 in FIGS. 4A and 4B, respectively. As shown in FIG. 4C, the disconnected part NT is no longer present in the encircling line 66A of the expanded partial image PI3. Thus, the expansion process can connect a disconnected part NT present in the encircling line 66A. Red object pixels in the expanded partial image PI3, such as the encircling line 66A, are fatter (expanded) compared to the encircling line 66A in the partial image PI1. The above contraction and expansion processes may also reduce processing load by eliminating unnecessary processes, such as a process performed with the noise pixel DT set as the target object.

The contraction range and the expansion range described above, i.e., the sizes of the filters FI1 and FI2, are merely one example of the degree of contraction achieved by the contraction process and the expansion achieved by the expansion process, respectively. When the contraction process is performed prior to the expansion process, the degree of the expansion process (i.e., the size of the filter FI1) is preferably larger than the degree of the contraction process (i.e., the size of the filter FI2). Setting the ranges to have this relationship can more appropriately connect the disconnected part NT.

Alternatively, the expansion process may be executed prior to the contraction process, in which the degree of the expansion process is preferably smaller than the degree of the contraction process. This relationship can more appropriately eliminate the noise pixel DT.

As described above, the contraction and expansion processes (S125 in FIG. 2) serve to eliminate the noise pixel DT and to connect the disconnected part NT. Accordingly, performing these processes can improve the precision in identifying the encircling lines in an object identification process described later. In addition, since the contraction and expansion processes can omit redundant processes, e.g. assuming noise pixels DT as target pixels, and therefore can reduce the work load of the image process unit 300.

In S130 of FIG. 2, the object identification unit 320 performs a labeling process on the binary image data resulting from the contraction and expansion processes to identify red objects and to assign discrete identifiers to the identified red objects. Consecutively, the object identification unit 320 generates label data correlating red objects with identifiers. Specifically, the object identification unit 320 firstly specifies a region configured of one or more consecutive (contiguous) red object pixels as one red object. In the example of FIG. 3B, the object identification unit 320 identifies three characters 61A-63A, the encircling line 66A, and the partial objects 67A and 68A, which are portions of the drawing 67 and the photo 68 (FIG. 3A). Next, the object identification unit 320 assigns discrete identifiers to these red objects.

In S145, the image process unit 300 executes the object identification process. The object identification process serves to identify an object representing an encircling line from among the identified red objects 61A-63A and 66A-68A.

Figure 5:
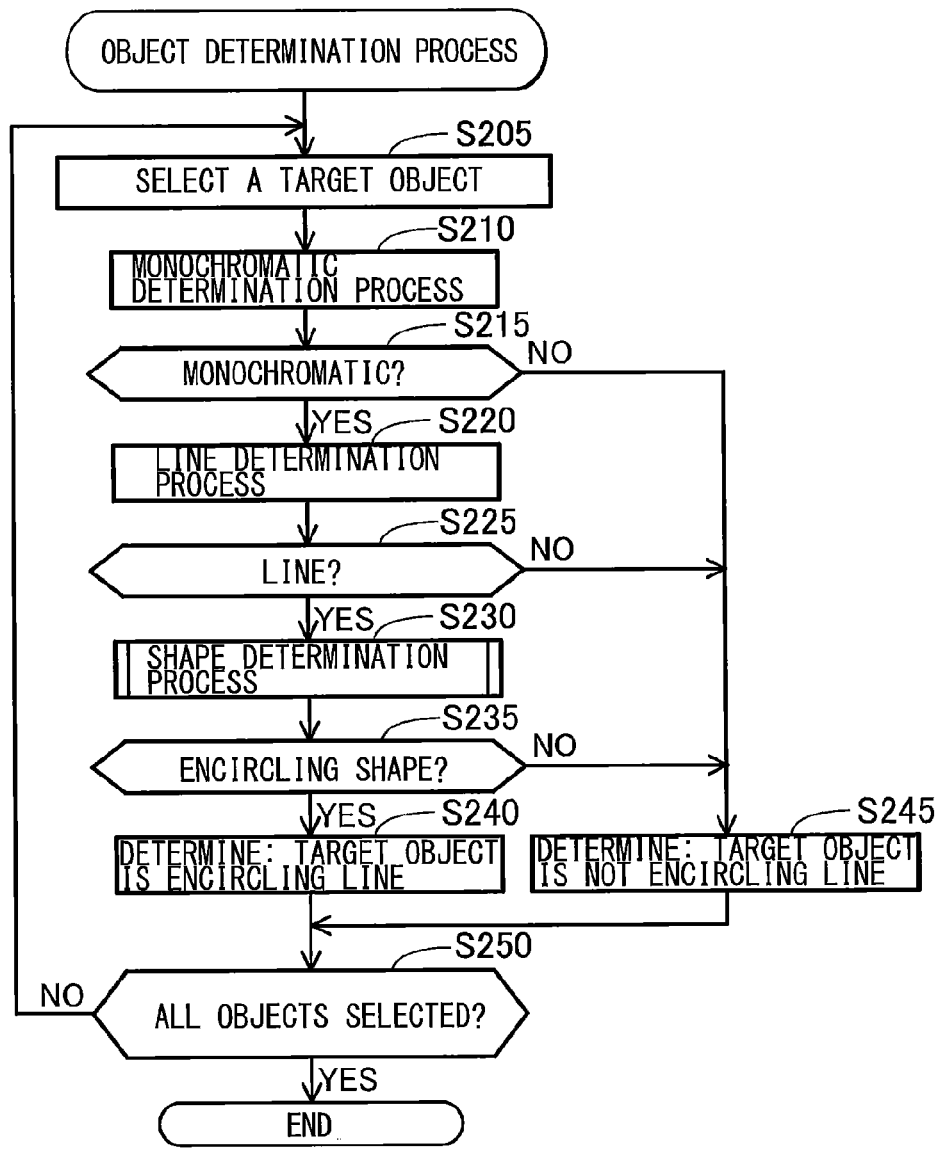
FIG. 5 is a flowchart illustrating steps in an object determination process according to the embodiment.

FIG. 5 is a flowchart illustrating steps in an object determination process. In S205 at the beginning of the process in FIG. 5, the image process unit 300 selects a red object to process. Using the example of FIG. 3B, the image process unit 300 selects one red object from among the characters 61A-63A, the encircling line 66A, and the partial objects 67A and 68A, which are portions of the drawing 67 and the photo 68, as the process target.

In S210 the color determination unit 330 executes a monochromatic determination process for determining whether the red object targeted in S205 is monochromatic. More specifically, the color determination unit 330 calculates average component values Rave1, Gave1, and Bave1 for the red object. The average component values Rave1, Gave1, and Bave1 are found by calculating the average value of each color component for all red object pixels constituting the target red object. Next, the color determination unit 330 calculates the ratios RT_R, RT_G, and RT_B of red object pixels having the respective red, green, and blue component values near the corresponding average component values Rave1, Gave1, and Bave1 for each color component using the following equations (1)-(3):

$$RT\_R = (PN\_Rave1/PNtotal) \qquad (1)$$

$$RT\_G = (PN\_Gave1/PNtotal) \qquad (2)$$

$$RT\_B = (PN\_Bave1/PNtotal) \qquad (3)$$

where PNtotal denotes the total number of red object pixels constituting the selected red object, and PN_Rave1, PN_Gave1, and PN_Bave1 are calculated for the respective red, green, and blue color components and denote the numbers of red object pixels whose respective color component values are near the corresponding average component values Rave1, Gave1, and Bave1.

In the first embodiment, the determination unit 330 determines that the R component value of the target pixel is near the average component R value, when the following equation (4) is satisfied. Similarly, the determination unit 330 determines whether the G and B component values are near the average component G and B values using the equations (5) and (6) as follows:

$$(Rave1 - \Delta V1) \leq R \leq (Rave1 + \Delta V1) \qquad (4)$$

$$(Gave1 - \Delta V1) \leq G \leq (Gave1 + \Delta V1) \qquad (5)$$

$$(Bave1 - \Delta V1) \leq B \leq (Bave1 + \Delta V1) \qquad (6)$$

where $\Delta V1$ is a permissible range (e.g. $\Delta V1$ can be set as 70 for 256-level gradation values in the first embodiment).

When the ratios RT_R, RT_G, and RT_B calculated for the respective color components are at least a reference value TH1 (that is, when RT_R≥TH1, RT_G≥TH1, and RT_B≥TH1), the color determination unit 330 determines that the target red object is monochromatic. If even one of the ratios RT_R, RT_G, and RT_B is less than the reference value TH1 (that is, when RT_R<TH1, RT_G<TH1, or RT_B<TH1), the color determination unit 330 determines that the target red object is not monochromatic. The reference value TH1 is a design value set through experimentation (0.6, for example). The pixels extracted as red object pixels in S120 of FIG. 2 include a relative wide color range covering light reds and dark reds to account for encircling lines drawn using a light red or dark red pen. Therefore, the determination made in S210 regarding whether the red object is monochromatic is relatively strict.

If the result of the monochromatic determination process in S210 is that the target red object is not monochromatic (S215: NO), in S245 the image process unit 300 determines that the target red object is not an encircling line. Since one encircling line is generally drawn in a single stroke, without exchanging pens in mid-stroke, an encircling line should be monochromatic. Thus, it is reasonable to expect the encircling line to be only dark red when using a dark red pen or only light red when using a light red pen. Therefore, monochromaticity is a required condition in the first embodiment when determining whether a red object is an encircling line and enables the image process unit 300 to determine accurately whether a red object is an encircling line. In the example of FIG. 3B, the encircling line 66A is determined to be monochromatic. However, if the partial object 67A in FIG. 3B includes multiple colors, such as dark and light reds, the image process unit 300 determines that the partial object 67A is not monochromatic.

If the target red object has been determined to be monochromatic (S215: YES), in S220 the line determination unit 340 executes a line determination process to determine whether the target red object is a line. The line determination process is implemented through a process of analyzing the distribution of red object pixels along a plurality of lines extending in prescribed directions within a process region that includes the red object.

Figure 6A:
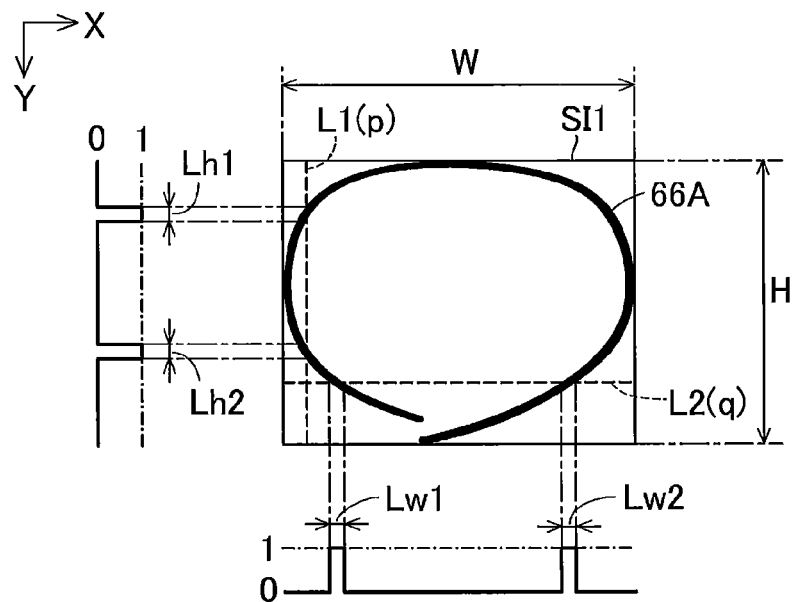
FIGS. 6A and 6B is an explanatory diagram illustrating a line determination process.
Figure 6B:
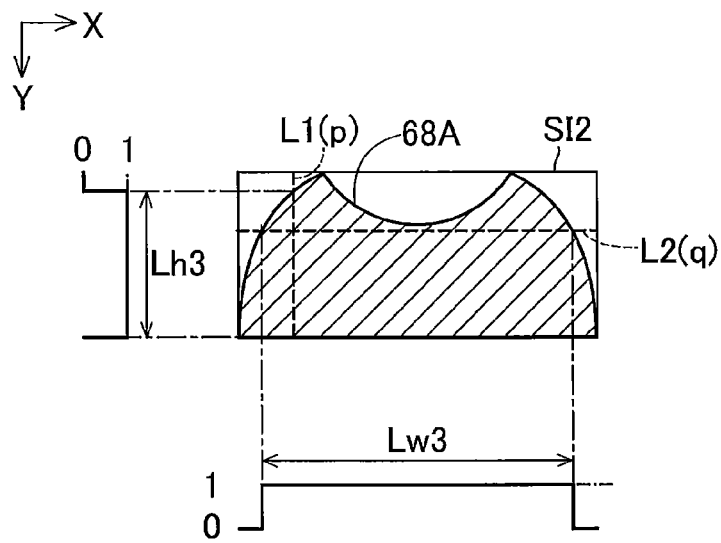

FIGS. 6A and 6B are explanatory diagrams illustrating the line determination process. FIG. 6A shows an example in which the encircling line 66A in the binary image 60A (see FIG. 3B) is the target red object. In this example, the line determination unit 340 identifies a rectangular region SI1 bounding the encircling line 66A as the process region. Next, the line determination unit 340 calculates the number of consecutive red object pixels (hereinafter called the consecutive pixel number) along a line L1($p$) in the rectangular region SI1 following a Y-direction (the vertical direction in FIG. 6A). Here, p is a value indicating the position of the line in an X-direction (the horizontal direction in FIG. 6; i.e., the X coordinate) and falls within the range $1 \leq p \leq W$, where W is the length of the rectangular region SI1 in the X-direction (in units of pixels). In the example of FIG. 6A, the line determination unit 340 calculates two consecutive pixel numbers Lh1 and Lh2 along the line L1($p$). In this case, the line determination unit 340 calculates the average value of the two consecutive pixel numbers Lh1 and Lh2 ((Lh1+Lh2)/2) as a consecutive pixel number LN1($p$) corresponding to the line L1($p$). The line determination unit 340 calculates a consecutive pixel number LN1($p$) for each of the W lines L1($p$) within the range $1 \leq p \leq W$.

In the same way, the line determination unit 340 calculates a consecutive pixel number of red object pixels along a line L2($q$) in the rectangular region SI1 following the X-direction. Here, q is a value indicating the position of the line in the Y-direction (i.e., the Y coordinate) and falls within the range $1 \leq q \leq H$, where H is the length of the rectangular region SI1 in the Y-direction (in units of pixels). In the example of FIG. 6A, the line determination unit 340 calculates these two consecutive pixel numbers Lw1 and Lw2. In this case, the line determination unit 340 calculates the average of the two consecutive pixel numbers Lw1 and Lw2 as a consecutive pixel number LN2($q$) corresponding to the line L2($q$). The object identification unit 320 calculates a consecutive pixel number LN2($q$) for each of the H lines L2($q$) within the range $1 \leq q \leq H$.

By calculating the number of consecutive red object pixels along each of the plurality of lines extending in both the X-direction and the Y-direction, the line determination unit 340 can identify the width of the object (line width LW) and, hence, can accurately identify the width of the object.

Next, the line determination unit 340 calculates the average of all W consecutive pixel number LN1($p$) computed for the W lines L1($p$) and all H consecutive pixel number LN2($q$) computed for the H lines L2($q$) and sets this average value as an average consecutive pixel number LNave for the target red object. When the red object is a line, the average consecutive pixel number LNave denotes the width of the line. The line determination unit 340 determines that the red object is a line when the average consecutive pixel number LNave is no greater than a reference value TH2 and determines that the red object is not a line when the average consecutive pixel number LNave is greater than the reference value TH2. The reference value TH2 is set to a value slightly larger than the maximum anticipated thickness of the pen, for example. Specifically, the reference value TH2 is set to a value of about 120 when the target image data is 600 dpi scan data. According to this process, the encircling line 66A in the example of FIG. 3B will be found to be a line.

FIG. 6B shows an example of the line determination process when the partial object 68A in the binary image 60A of FIG. 3B is the target red object. Since this red object is not a line, a consecutive pixel number Lh3 along the line L1($p$) in the Y direction and a consecutive pixel number Lw3 along the line L2($q$) in the X-direction are relatively large, as illustrated in the drawing. As a result, the line determination unit 340 will determine that the partial object 68A is not a line in the line determination process.

If the line determination unit 340 determined in the line determination process that the target red object is not a line (S225: NO), in S245 the image process unit 300 determines that the target red object is not an encircling line. Since a single encircling line is most likely a single line drawn in a red pen in a single stroke, the line determination process is set as one of required conditions for determining that the red object is an encircling line. In this way, the image process unit 300 can accurately determine whether a red object is an encircling line.

When the line determination unit 340 determines that the target red object is a line (S225: YES), in S230 the shape determination unit 350 executes a shape determination process to determine whether the target red object has an encircling shape to surround a part of the scanned image 60.

Figure 9A:
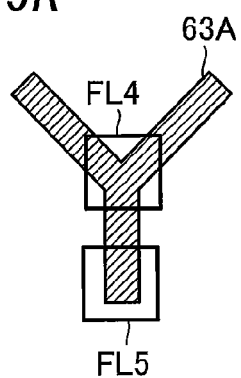
FIG. 9A shows an example in which an object is a character.
Figure 9B:
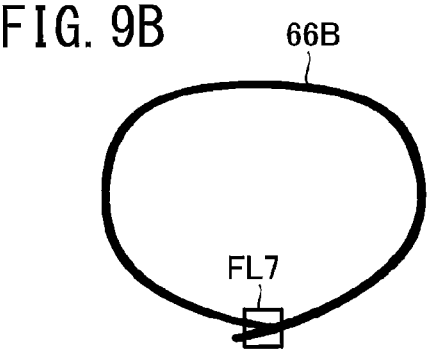
FIG. 9B shows an example of an encircling line and the shape determination process.
Figure 9C:
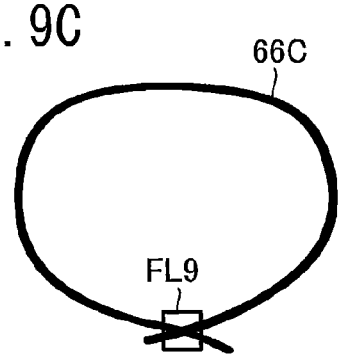
FIG. 9C shows an example of the encircling line and the shape determination process.

FIG. 7 is a flowchart illustrating steps in the shape determination process of S230. FIGS. 8A-8C are a first set of explanatory diagrams for the shape determination process, and FIGS. 9A-9C are a second set of explanatory diagrams for the shape determination process. In S305 at the beginning of the process in FIG. 7, the shape determination unit 350 selects one red object pixel constituting the red object as a target pixel. More specifically, the shape determination unit 350 scans each of a plurality of lines Lx extending in the X-direction within the rectangular region SI1 (see FIG. 8A) in order beginning from the −Y side of the rectangular region SI1 (the top in FIG. 8A) and selects each detected red object pixel one at a time.

In S310 the frame region setting unit 351 of the shape determination unit 350 sets a frame region FL corresponding to the selected target pixel. FIG. 8B shows an example of the frame region FL set for a target pixel NP. As shown in FIG. 8B, the frame region FL is a square-shaped border region. The thickness of the border is one pixel. FIG. 8C shows an equation expressing a width FW of the frame region FL in both the X- and Y-directions in units of pixels. As can be seen in the equation, the width FW of the frame region FL is set based on the scanning resolution RS of the scanned image 60 (in units of dots per inch (dpi)), the line width LW of the red object (in units of pixels), and a size OBS of the red object (units of pixels). The average consecutive pixel number LNave calculated in the line determination process (S220 of FIG. 5) may be used as the line width LW, for example. Further, the average of the horizontal width W and vertical width H of the rectangular region SI1 ((H+W)/2) may be used as the object size OBS. In the first embodiment, the frame region FL is arranged such that the target pixel NP is positioned in its center.

In S315 the intersection number determination unit 352 of the shape determination unit 350 calculates a number Mv of partial object regions within the frame region FL. The partial object region is a region within the frame region FL that has contiguous red object pixels. In the example of FIG. 8B, the frame region FL includes two partial object regions OA1 and OA2. Therefore, the value of the number Mv is set to "2". The number Mv is calculated in order to recognize the number of times that the red object intersects the frame region FL. As shown in FIG. 8B, the number Mv indicates that the target red object intersects the frame region FL twice. For this reason, the number Mv will be called the intersection number Mv. When the intersection number Mv is 2, it can be inferred that the red object passes through the position of the target pixel NP in the center of the rectangular area framed by the frame region FL (hereinafter called the "framed rectangular area") and, hence, is a single line traversing the framed rectangular area. Note that being positioned within the frame region FL means being positioned within a frame having a thickness of one pixel. In other words, pixels positioned within the frame region FL can also be said to be pixels constituting the frame region FL. In the example of FIG. 8B, the partial object regions OA1 and OA2 are positioned within the frame region FL, but the plurality of red object pixels including the target pixel NP that are positioned between the partial object regions OA1 and OA2 are not positioned within the frame region FL. Further, "being positioned inside the framed rectangular area" signifies being enclosed by the frame region FL or positioned within the frame region FL. In the example of FIG. 8B, all pixels constituting the partial object regions OA1 and OA2 and all red object pixels including the target pixel NP positioned between the partial object regions OA1 and OA2 are considered to be inside the framed rectangular area.

A frame region FL2 shown in FIG. 8A is an example in which the intersection number Mv is 2 and is clearly a red object forming a single line that passes through the center of the framed rectangular area and traverses the same. On the other hand, a frame region FL1 in FIG. 8A shows an example in which the intersection number Mv is 1. Thus, while the red object is a single line that passes through the center of the framed rectangular area, the object terminates inside the framed rectangular area and does not traverse the entire region.

In S320 of FIG. 7, the shape determination unit 350 determines whether all red object pixels have been selected as the target pixel. When there remain any unselected red object pixels (S320: NO), the shape determination unit 350 returns to S305, selects one of the unselected red object pixels, and repeats the process described above in steps S305-S320. When all red object pixels have been selected (S320: YES), the shape determination unit 350 advances to S325. Once the process moves to S325, intersection numbers Mv have been calculated for frame regions FL corresponding to all red object pixels that constitute the target red object. Hereinafter, red object pixels corresponding to frame regions FL whose intersection number Mv is A (where A is an integer of 0 or greater) will simply be called red object pixels having an intersection number Mv of A. The following description will also use the expression "the intersection number Mv of a red object pixel is A" when the red object intersects the frame region FL corresponding to the red object pixel A times.

In S325 the shape determination unit 350 calculates a ratio RT2 of red object pixels having an intersection number Mv of 2 to the total number of red object pixels. Red object pixels having an intersection number Mv of 2 will be called "first specific pixels." In S330 the condition determination unit 353 of the shape determination unit 350 determines whether the ratio RT2 is greater than or equal to a reference value THa. When the ratio RT2 is at least the reference value THa (S330: YES), in S370 the shape determination unit 350 determines that the red object has an encircling shape. When the red object has an encircling shape, it is likely that the intersection number Mv is 2 for most of the red object pixels (target pixels), as in the frame region FL2 shown in FIG. 8A. While there may be some exceptions in which the intersection number Mv is not 2 for red object pixels near the ends of the encircling line drawn in one stroke, as in the frame region FL1 shown in FIG. 8A. It is also possible that some of the red object pixels will not have an intersection number Mv of 2 due to noise. By setting the reference value THa to an appropriate value based on these considerations, it is possible to accurately determine whether the red object has an encircling shape. The reference value THa is set to 0.85 in the first embodiment.

FIG. 9A shows an example in which the selected red object is the character 63A (see FIG. 3B). A frame region FL4 in FIG. 9A shows an example in which the intersection number Mv is 3. Thus, it is clear that the red object is formed with three branches within the framed rectangular area. There is also a high probability that red object pixels near the ends of a character's lines have an intersection number Mv of 1, as in the frame region FL5 in FIG. 9A. Consequently, since characters frequently have parts with three or more branches and three or more end parts, the ratio of red object pixels having an intersection number Mv of a value other than 2 is higher when the red object is a character than when the red object has an encircling shape. Therefore, there is a strong probability that a red character will be found to be monochromatic in the monochromatic determination process of S210 (FIG. 5) and will be found to be a line in the line determination process of S220 (FIG. 5). However, a red character will not be determined to have an encircling shape in the shape determination process. Therefore, by using the ratio RT2 in the shape determination process, the shape determination unit 350 can accurately determine that a red object other than an encircling line (a character, for example) does not have an encircling shape. Similarly, the shape determination unit 350 can accurately determine that a red object forming an encircling line has an encircling shape by employing the ratio RT2.

Here, the width FW of the frame region FL is set increasingly larger in the equation of FIG. 8C for a larger scanning resolution RS, for a larger line width LW of the red object, or for a larger object size OBS for the following reasons. If the width FW of the frame region FL is excessively smaller than the line width LW, it may be impossible to calculate the intersection number Mv indicating the number of branches with accuracy, particularly in an extreme case in which the entire framed rectangular area inside the frame region FL is completely filled with red object pixels. Further, if the width FW of the frame region FL is excessively larger than the object size OBS and the line width LW, there is a strong possibility that a plurality of separated parts in the same red object may be positioned within the framed rectangular area of the frame region FL. For example, there is a relatively high possibility that a plurality of lines may be positioned within the framed rectangular area of the frame region FL. Consequently, it may be impossible to calculate the intersection number Mv indicating the number of branches for a single part passing through the target pixel NP with accuracy. Here, since the dimensions of the original corresponding to one pixel (for example, 1/300 inches for 300 dpi) is smaller when the scanning resolution RS is higher, the width FW of the frame region FL specified in units of pixels is set larger for a higher scanning resolution RS. Thus, it is possible to set the width FW of the frame region FL to a value (in units of pixels) suitable for the anticipated size of the encircling line on the original.

If the ratio RT2 of red object pixels having an intersection number Mv of 2 is less than the reference value THa (S330: NO), the shape determination unit 350 advances to step S340. In other words, when the ratio RT2 of red object pixels having an intersection number Mv of 2 is less than the reference value THa, the shape determination unit 350 does not immediately determine that the red object does not have an encircling shape. Thus, there is still a possibility that the red object is an encircling line when the ratio RT2 of red object pixels having an intersection number Mv of 2 is relatively low, provided that the red object satisfies a prescribed condition.

As described above, in the example of the encircling line 66A shown in FIG. 8A, red object pixels with an intersection number Mv of 1 exist on both the starting end and stopping end of the encircling line 66A drawn in a single stroke. Specifically, red object pixels with an intersection number Mv of 1 may be produced when the ends of a single-stroke encircling line (the starting and stopping ends) do not meet perfectly, such as when the ends are separated as shown in FIG. 8A, when one end meets a portion of the encircling line near to but offset from the other end as shown in FIG. 9B, or when the encircling line intersects itself near both ends as shown in FIG. 9C.

In an encircling line 66B shown in the example of FIG. 9B, one end of the line meets a portion of the line at a position offset from the other end, producing a red object pixel with an intersection number Mv of 3 (see the frame region FL7 in FIG. 9B). Further, an encircling line 66C in the example of FIG. 9C intersects itself at points near both ends, producing a red object pixel with an intersection number Mv of 4 (see the frame region FL9 in FIG. 9C). Further, unless noise is a factor, there are no red object pixels having an intersection number Mv of 5 or greater in a red object that is an single-stroke encircling line. Hereinafter, red object pixels having an intersection number Mv of 1, 3, or 4 will be collectively called "second specific pixels," and red object pixels having an intersection number Mv of 5 or greater will be collectively called "third specific pixels." From the above description, it should be clear that a red object has a relatively high possibility of being an encircling line if the distribution of second and third specific pixels meets the characteristics of the encircling lines described above, even when the ratio RT2 of the first specific pixels is less than the reference value THa. The process beginning from S340 is executed to account for such cases.

In S340 the condition determination unit 353 of the shape determination unit 350 calculates a ratio RT5 of red object pixels with an intersection number Mv of 5 or greater (third specific pixels) to the total number of red object pixels. In S350 the condition determination unit 353 determines whether the ratio RT5 of third specific pixels is no greater than a reference value THb. If the ratio RT5 is greater than the reference value THb (S350: NO), in S375 the shape determination unit 350 determines that the red object does not have an encircling shape because third specific pixels are generally not present when the red object is an single-stroke encircling line, excluding third specific pixels produced by noise or other exceptional factors. Accordingly, the reference value THb is set to a value slightly larger than an upper limit of third specific pixels that may be produced by noise when the red object is an encircling line, for example. In the first embodiment, the reference value THb is set to 0.1. Use of the ratio RT5 in the shape determination process can appropriately eliminate red objects that are not encircling lines from the targets of determination.

Figures 10A, 10B:
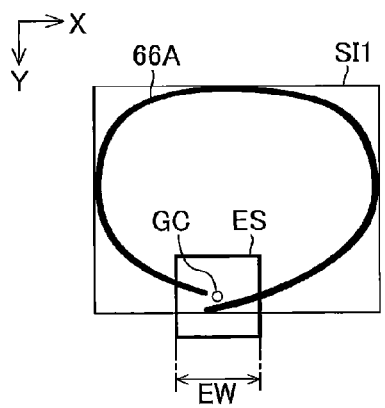
FIG. 10A shows an example of the encircling line and a center of gravity.
FIG. 10B shows an equation expressing a width of the specific region.

If the ratio RT5 of third specific pixels is no greater than the reference value THb (S350: YES), in S355 the shape determination unit 350 sets a specific region ES to be used in a determination described next. FIGS. 10A and 10B are explanatory diagrams illustrating the determination using the specific region ES. The shape determination unit 350 calculates a center of gravity GC for a plurality of red object pixels having an intersection number Mv of 1, 3, or 4 (second specific pixels), based on the positions (coordinates) of a plurality of second specific pixels. As described above, the second specific pixels are concentrated near the ends of an single-stroke encircling line when the red object is an encircling line (see FIGS. 8A, 9B, and 9C). Therefore, when the red object is an encircling line, the center of gravity GC is positioned near the ends of the encircling line, as shown in the example of FIG. 10A.

The shape determination unit 350 then sets a specific region ES that is square in shape and centered on the center of gravity GC. The equation in FIG. 10B expresses a width EW (in units of pixels) for both the X and Y dimensions of the specific region ES. As with the width FW of the frame region FL described with reference to FIG. 8C, the width EW of the specific region ES is set based on the scanning resolution RS of the scanned image 60, the line width LW of the red object, and the object size OBS of the red object.

In S360 the condition determination unit 353 of the shape determination unit 350 calculates a ratio RTC within the specific region ES to the total number of second specific pixels. In S365 the shape determination unit 350 determines whether the ratio RTC of second specific pixels is at least a reference value THc. When the ratio RTC is smaller than the reference value THc (S365: NO), in S375 the shape determination unit 350 determines that the red object does not have an encircling shape. As described above, the second specific pixels are concentrated in one portion of a red object when the object is an single-stroke encircling line, and particularly near the ends of the encircling line (i.e., within the specific region ES). On the other hand, characters are configured of lines having ends distributed in a plurality of locations. The character "Y" in the example of FIG. 9A has one end in the lower center region, one end in the upper right region, and one end in the upper left region. Further, the lines configuring characters can have branches of various numbers. The character "Y" in the example of FIG. 9A has three branches in the center region thereof. Therefore, the second specific pixels are more likely to be distributed in red objects that are characters, rather than being concentrated in one part of the red object. Use of the ratio RTC in the shape determination process enables the shape determination unit 350 to more accurately determine when a red object does not have an encircling shape (e.g., a character) and when the red object has an encircling shape (e.g., an encircling line). The reference value THc is a design value set through experimentation and is set to 0.5 in the first embodiment.

When the ratio RTC of the second specific pixels is greater than or equal to the reference value THc (S365: YES), in S370 the shape determination unit 350 determines that the red object has an encircling shape.

As with the width FW of the frame region FL described with reference to FIG. 8C, the width EW of the specific region ES in the equation of FIG. 10B is set to a larger value when the scanning resolution RS is larger, when the line width LW of the red object is larger, and when the object size OBS is larger. If the width EW of the specific region ES is excessively larger than the object size OBS, the ratio RTC is likely to be greater than or equal to the reference value THc, even when the second specific pixels are distributed over a relatively wide range. Further, if the width EW of the specific region ES is excessively smaller than the object size OBS, the ratio RTC is likely to be less than the reference value THc, even when the second specific pixels are concentrated in a relatively small range. Therefore, the specific region ES is preferably set to a size that is suitable for the object size OBS. If the red object is an encircling line and the line width LW of the object is correlated with the object size, it may be considered likely that the line width LW will become thicker as the object size increases. Further, since the dimensions of the original corresponding to one pixel (1/300 inches for a resolution of 300 dpi, for example) decreases for a higher scanning resolution RS, the width EW of the specific region ES specified in units of pixels is larger for a higher scanning resolution RS. As a result, it is possible to set the width FW of the specific region ES (in units of pixels) to a value suitable for the anticipated size of the encircling line on the original.

The shape determination process ends after the shape determination unit 350 determines in S370 or S375 whether the target red object has an encircling shape. The shape determination process described above employs the following three conditions for determining whether the target red object has an encircling shape.

(1) The ratio RT2 of first specific pixels is at least the reference value THa (S330)
(2) The ratio RT5 of third specific pixels is less than the reference value THb (S350)
(3) The ratio RTC of second specific pixels is at least the reference value THc (S365)

In the first embodiment, a red object is determined to have an encircling shape when condition (1) is met, regardless of the other conditions. Similarly, a red object is determined to have an encircling shape even when condition (1) is not met, provided that both conditions (2) and (3) are met. However, the use of these conditions (1)-(3) is merely one example, and the invention is not limited to this example. The use of conditions (1)-(3) may be modified by setting the reference values THa, THb, and THc larger or smaller. For example, a red object may be considered to have an encircling shape when conditions (1) and (2) are met or when conditions (2) and (3) are met, and may be considered not to have an encircling shape in all other cases. Alternatively, a red object may be determined to have an encircling shape only when all conditions (1)-(3) are met. Alternatively, a red object may be determined to have an encircling shape when condition (1) is met, and may be determined not to have an encircling shape when condition (1) is not met, regardless of (2) and (3).

According to FIG. 5, when the shape determination unit 350 determined through the shape determination process that the target red object does not have an encircling shape (S235: NO), in S245 the image process unit 300 determines that the target red object is not an encircling line. On the other hand, when the shape determination unit 350 determined in the shape determination process that the target red object has an encircling shape (S235: YES), in S240 the image process unit 300 determines that the target red object is an encircling line. In other words, the red object is determined to be an encircling line when the object is monochromatic (S215: YES), is a line (S225: YES), and has an encircling shape (S235: YES). The red object is determined not to be an encircling line when the red object is not monochromatic (S215: NO), is not a line (S225: NO), or does not have an encircling shape (S235: NO). In the example of FIG. 3B, only the encircling line 66A is determined to be an encircling line, while the characters 61A-63A and the partial objects 67A and 68A are determined not to be encircling lines.

In S250 the image process unit 300 determines whether all red objects have been selected to be the target object. If there remain any unselected red objects (S250: NO), the image process unit 300 returns to S205, selects a red object that has not been previously selected, and repeats the above process in steps S205-S250. Once all red objects have been selected (S250: YES), the image process unit 300 ends the object determination process.

Figure 3C:
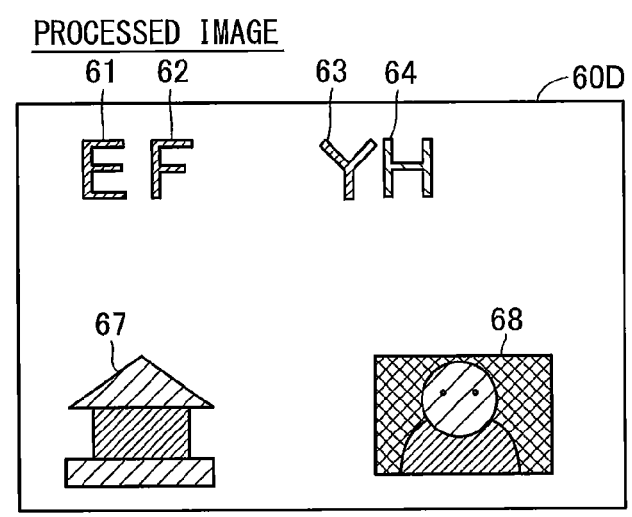
FIG. 3C shows processed image data representing a processed image.

After completing the object determination process of S145 (see FIG. 2), one of the identified encircling lines (one of the red objects determined to be an encircling line) is selected as the process target in S150. Since the encircling line 66A (see FIG. 3B) is the only object identified in the example of FIG. 3, the removal process unit 360 selects the encircling line 66A.

In S155 the removal process unit 360 generates partial image data that includes the object to be removed. Specifically, the removal process unit 360 identifies a minimum bounding rectangle OS1 (see FIG. 3B) in the binary image 60A that bounds the encircling line 66. The removal process unit 360 generates partial image data representing a partial image PSI corresponding to the minimum bounding rectangle OS1 by cropping the partial image PSI from the scanned image 60 (see FIG. 3A).

Figure 11A:
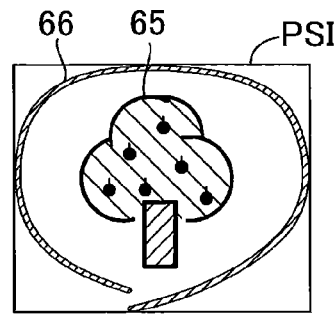
FIG. 11A shows an example of a partial image.
Figure 11B:
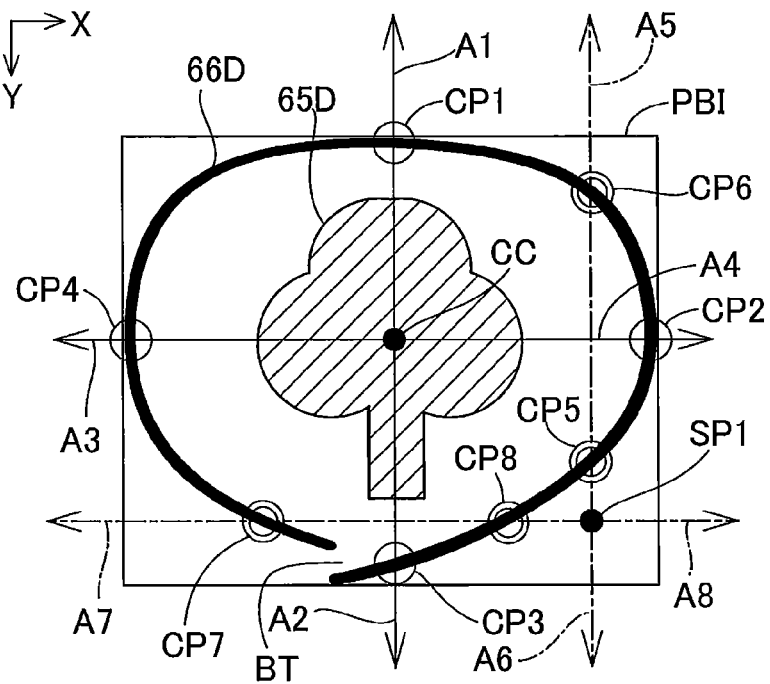
FIG. 11B shows a partial binary image of the partial image shown in FIG. 11A.

FIGS. 11A and 11B shows an example of the partial image PSI (FIG. 11A) and an example of a partial binary image PBI (FIG. 11B). As shown in FIG. 11A, the partial image PSI includes the encircling line 66 and drawing 65 as objects.

In S160, the removal process unit 360 generates partial binary image data by performing a thresholding process on the partial image data to identify objects in the partial image PSI. More specifically, the removal process unit 360 converts the partial image data to binary values indicating either background pixels constituting the background or object pixels constituting an object. As an example, the removal process unit 360 calculates average values Rave2, Gave2, and Bave2 for the color components of a plurality of pixels positioned near the encircling line 66A (see FIG. 3B), such as pixels positioned on the outside of the encircling line 66A and along the same, and uses these average values as a reference color for the thresholding process. Alternatively, the removal process unit 360 may calculate the average values Rave2, Gave2, and Bave2 for the color components of a plurality of pixels in the scanned image 60 positioned outside the partial image PSI and along the outer edge of the same, and uses these average values as a reference color for the thresholding process. The removal process unit 360 then classifies pixels having pixel values (RGB values) that satisfy the expressions (Rave2−ΔV2)≤R≤(Rave2+ΔV2), (Gave2−ΔV2)≤G≤(Gave2+ΔV2), and (Bave2−ΔV2)≤B≤(Bave2+ΔV2) as background pixels and classifies all pixels whose values do not satisfy these expressions as object pixels. The removal process unit 360 generates the partial binary image data by classifying all pixels in the partial image PSI as either background pixels or object pixels.

In S165 the removal process unit 360 performs a labeling process on the partial binary image data generated in S160. In the labeling process, the removal process unit 360 identifies objects and assigns identifiers to the objects. That is, the removal process unit 360 generates label data in the labeling process that associates objects with identifiers.

Specifically, the removal process unit 360 identifies each region configured of one or more contiguous (neighboring) object pixels as one object. Thus, in the partial binary image PBI of the example in FIG. 11B, the removal process unit 360 identifies an encircling line 66D and a drawing 65D as objects configured of object pixels and assigns unique identifiers to these objects. Note that the objects identified in the partial binary image PBI include the encircling line selected as a process target in S150. Here, a special identifier different from identifiers assigned to other objects may be assigned to objects representing encircling lines in order to distinguish encircling lines from other objects.

After identifying objects in the partial binary image PBI, in S170 the removal process unit 360 executes an inclusion relation determination process to identify whether objects in the partial binary image PBI, other than encircling line objects, are enclosed by encircling lines.

Figure 12:
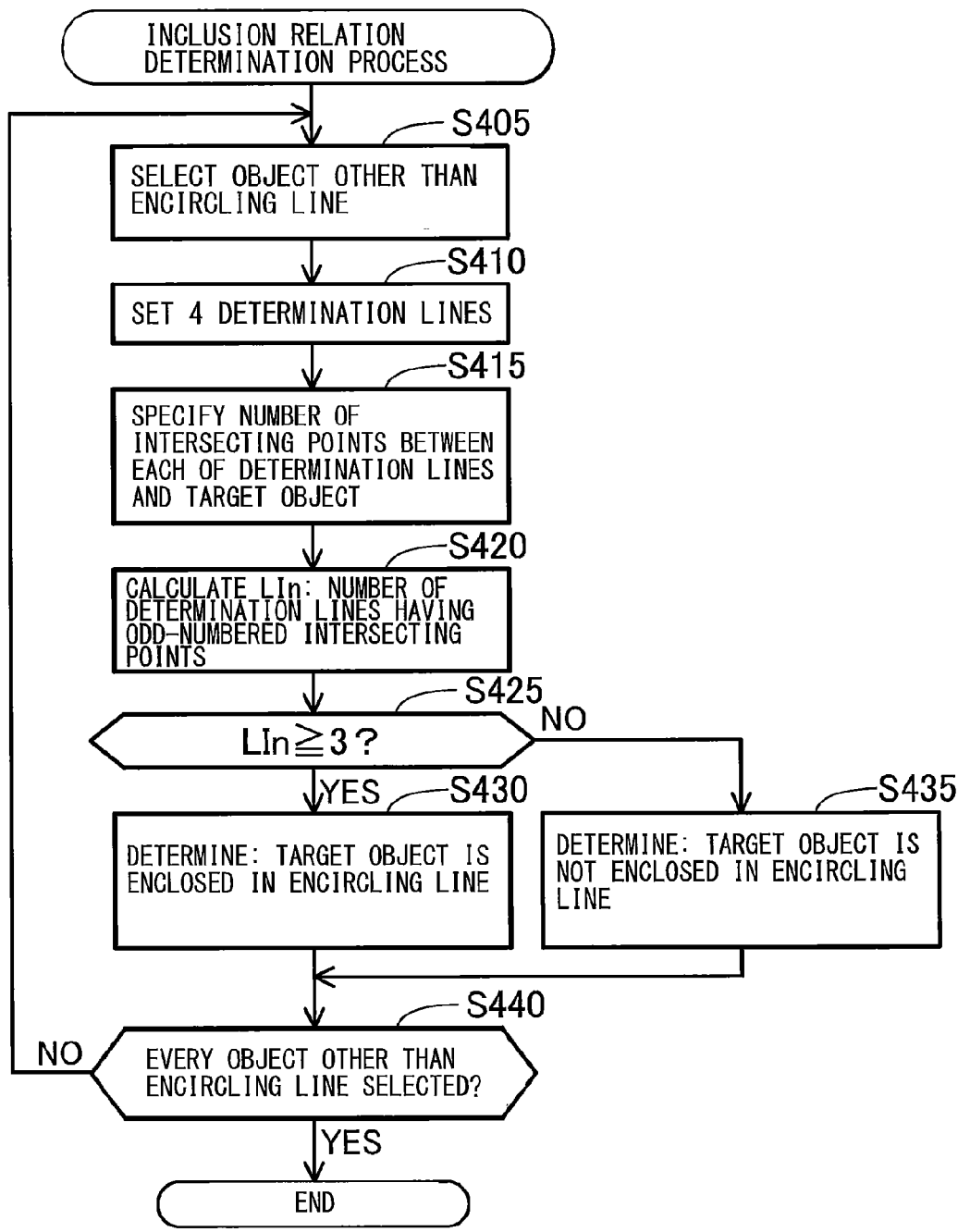
FIG. 12 is a flowchart illustrating steps in an inclusion relation determination process according to the embodiment.

FIG. 12 is a flowchart illustrating steps in the inclusion relation determination process. In S405 at the beginning of the process in FIG. 12, the removal process unit 360 selects one non-encircling-line object from among the objects identified in the partial binary image PBI to be the process target. In the example of FIG. 11B, the removal process unit 360 selects the drawing 65D as the target object.

In S410 the removal process unit 360 sets four determination lines A1-A4 over the partial binary image PBI, as shown in FIG. 11B. The determination lines A1-A4 begin from the center of gravity CC of the target object (the drawing 65D in this example) as the point of origin, and extend respectively upward (−Y direction), downward (+Y direction), leftward (−X direction), and rightward (+X direction).

In S415 the removal process unit 360 identifies the number of intersecting points between each of the determination lines A1-A4 and the encircling line 66D (hereinafter called an intersecting point number Mx). That is, the removal process unit 360 selects each of the determination lines in turn and sequentially scans pixels on the determination line from the point of origin (center of gravity CC) outward. The removal process unit 360 counts the number of intersecting points detected on the determination lines. In the example of FIG. 11B, the encircling line 66D intersects the determination lines A1-A4 one time each for a total of four intersecting points CP1-CP4.

In S420 the removal process unit 360 determines whether the intersecting point number Mx is odd for each determination line and counts the number of determination lines among the lines A1-A4 that have an odd-numbered intersecting point number Mx (hereinafter called the "odd-numbered determination line number LIn"). In the example of FIG. 11B, the intersecting point number Mx is 1 for each of the determination lines A1-A4. Accordingly, the odd-numbered determination line number LIn is 4.

In S425 the removal process unit 360 determines whether the odd-numbered determination line number LIn is at least 3. If the odd-numbered determination line number LIn is 3 or greater (S425: YES), in S430 the removal process unit 360 determines that the target object is enclosed in the encircling line 66D. If the odd-numbered determination line number LIn is less than 3 (S425: NO), in S435 the removal process unit 360 determines that the target object is not enclosed in the encircling line 66D.

If it is assumed that the encircling line 66D is a closed curve and that the end points of the determinations lines (the edges of the partial binary image PBI) are outside the closed curve, then when the removal process unit 360 scans each determination line from the point of origin to the end point, the internal/external relationship of the target point (scanning position) on the determination line to the closed curve will change when passing through the intersecting point with the encircling line 66D. This change in the internal/external relationship signifies that the position of the target point changes from inside the encircling line to outside the encircling line or from outside the encircling line to inside the encircling line. Hence, when the point of origin for the determination line is positioned inside the encircling line, the intersecting point number Mx between the point of origin and the end point of the determination line should be odd-numbered since the end point is always positioned outside the encircling line.

Conversely, if the point of origin of the determination line is positioned outside of the encircling line, the intersecting point number Mx from the point of origin to the end point of the determination line will be even-numbered. As an example, FIG. 11B shows a sample point SP1 positioned outside the encircling line 66D, and four determination lines A5-A8 extending from the sample point SP1 in upward, downward, leftward, and rightward directions, respectively. The two determination lines A5 and A7 intersect the encircling line 66D at two points (intersecting points CP5 and CP6 for the determination line A5, and intersecting points CP8 and CP7 for the determination line A7). The other two determination lines A6 and A8 do not intersect the encircling line 66D at all (have zero intersecting points). Thus, the intersecting point number Mx between the point of origin and the end point of each determination line beginning from the sample point SP1 positioned outside the encircling line 66D is even (0 or 2 in this example).

By setting determination lines with their base points on the target object, it is possible to determine whether the target object is enclosed in the encircling line (is inside the encircling line) based on the intersecting point number Mx of intersections between each determination line and the encircling line. In the above example, the removal process unit 360 sets four determination lines A1-A4 and determines that the target object is enclosed in the encircling line when at least three of the determination lines have an odd-numbered intersecting point number Mx. Here, four determination lines are used because there are some exceptions in which the intersecting point number Mx may be even-numbered, even though the target object is enclosed by the encircling line. For example, since the encircling line 66D is likely handwritten on the original, a gap BT may be formed between the ends of the encircling line 66D, as illustrated in FIG. 11B. If the determination line A2 extending downward in FIG. 11B were to pass through the gap BT, the intersecting point number Mx for the determination line A2 would clearly be 0 (even-numbered). If the removal process unit 360 were to make its determination based on this single determination line, the determination would be incorrect. However, in the first embodiment the removal process unit 360 makes its determination based on whether the odd-numbered determination line number LIn is 3 or greater for the four determination lines. Accordingly, the removal process unit 360 can correctly determine the inclusion relation, even when the intersecting point number Mx for one of the determination lines is even-numbered.

In S440 the removal process unit 360 determines whether all non-encircling-line objects have been selected to be the process target. If there remain any objects that have not been selected (S440: NO), the removal process unit 360 returns to S405, selects a non-encircling-line objects that has not previously been selected, and repeats the above process in steps S405-S440. Once all objects have been selected (S440: YES), the removal process unit 360 ends the inclusion relation determination process.

After completing the inclusion relation determination process, in S170 of FIG. 2 the removal process unit 360 executes an object removal process to remove the encircling line 66 and objects found to be enclosed by the encircling line 66 from the scanned image 60 (see FIG. 3A). The removal process unit 360 identifies the plurality of pixels in the scanned image 60 constituting the encircling line 66 and in the objects enclosed by the encircling line 66 (the drawing 65 in this example) based on the partial binary image PBI (FIG. 11B). The removal process unit 360 changes the pixel values of the identified pixels to values representing the color of the background in the scanned image 60. Pixel values representing the color of the background may be values expressing the color of the paper of the original (white, for example) or the pixel values Rave2, Gave2, and Bave2 representing the reference color calculated in S160 for the thresholding process. Through this process, the removal process unit 360 generates processed image data representing a processed image 60D (see FIG. 3C) that corresponds to the scanned image 60 after the encircling line 66 and drawing 65 have been removed.

In S180 the image process unit 300 determines whether all encircling lines have been selected. If there remain any unselected encircling lines (S180: NO), the image process unit 300 returns to S150, selects an encircling line that has not yet been selected, and repeats the process described above in steps S150-S180. Once all encircling lines have been selected (S180: YES), in S185 the image process unit 300 transmits the processed image data to the multifunction peripheral 200, i.e., the source of the transmitted scan data (target image data), and subsequently ends the process.

Upon receiving the processed image data from the server 400, the image data transmission/reception unit 115 of the multifunction peripheral 200 stores the image data (e.g. in the nonvolatile storage device 230) and ends the process. The multifunction peripheral 200 may subsequently use the processed image data for printing an image represented by the data on paper with the printing unit 240.

Through the image process of the first embodiment described above, the user can draw an encircling line around a desired object on an original using a red pen, scan the original with the scanning unit 250 of the multifunction peripheral 200, and obtain image data representing an image of the original after the desired object has been removed. Note that encircling lines may be used for other purposes than specifying objects to be removed. For example, in place of the object removal process of S175, the image process unit 300 may execute a process to generate image data representing an image that includes only an image representing the objects encircled by encircling lines, with all objects not encircled by encircling lines removed. Generally speaking, encircling lines may be used to identify objects enclosed therein and to execute prescribed image processes on partial image data representing partial images that include the identified objects.

In the image process according to the first embodiment, the image process unit 300 determines whether a red object is an encircling line based on frame regions FL (see FIG. 8B) set for each of a plurality of specific pixels (red object pixels) constituting the object. The image process unit 300 can suitably analyze the shape of a red object by analyzing the branches of the object based on the intersection number Mv of each frame region FL and can suitably determine whether the red object is an encircling line.

More specifically, the shape determination unit 350 determines whether a red object is an encircling line based on the ratio RT2 of first specific pixels corresponding to frame regions FL having an intersection number Mv of 2 (frame regions FL including two partial object regions) from among the plurality of specific pixels (S325 of FIG. 7). In this way, the shape determination unit 350 can accurately determine whether a red object is an encircling line.

Further, the shape determination unit 350 determines whether a red object is an encircling line using the ratio RTC of second specific pixels in the specific region ES (see FIG. 10A) among the second specific pixels corresponding to frame regions FL having an intersection number Mv of M (where M is 1, 3, or 4; S365 of FIG. 7). In this way, the shape determination unit 350 can more accurately determine whether the red object is an encircling line.

Further, the shape determination unit 350 determines whether the red object is an encircling line based on the ratio RT5 of third specific pixels corresponding to frame regions FL having an intersection number Mv of 5 or greater (S340 of FIG. 7). In this way, the shape determination unit 350 can more accurately determine whether the red object is an encircling line.

Further, the image process unit 300 can suitably determine whether a red object is an encircling line by setting the size of the frame region FL (FIG. 8C) and the size of the specific region ES (FIG. 10B) based on the scanning resolution RS, the line width LW (i.e., the number of consecutive object pixels in a specific direction; see FIG. 6A), and the object size OBS. As can be seen from the equation in FIG. 8C, the size of the frame region FL is set to a first pixel number when the scanning resolution RS is a first resolution (300 dpi, for example) and is set to a second pixel number greater than the first pixel number (two times the first pixel number, for example) when the scanning resolution RS is a second resolution higher than the first resolution (600 dpi, for example). Further, the size of the frame region FL is set to a first area when the object size OBS is a first size and is set to a second area greater than the first area when the object size OBS is a second size that is greater than the first size. Further, the size of the frame region FL is set to a third area when the line width LW is a first width and is set to a fourth area greater than the third area when the line width LW is a second width that is greater than the first width. The size of the specific region ES is similarly set. As can be seen from the equation in FIG. 8C, the object size OBS, line width LW, and first through fourth areas are expressed in units of pixels.

Further, the shape determination process of the first embodiment can determine whether a red object has an encircling shape more quickly than a process that performs image processing together with a thinning process or the like since the thinning process may require a relatively long processing time.

Figure 13:
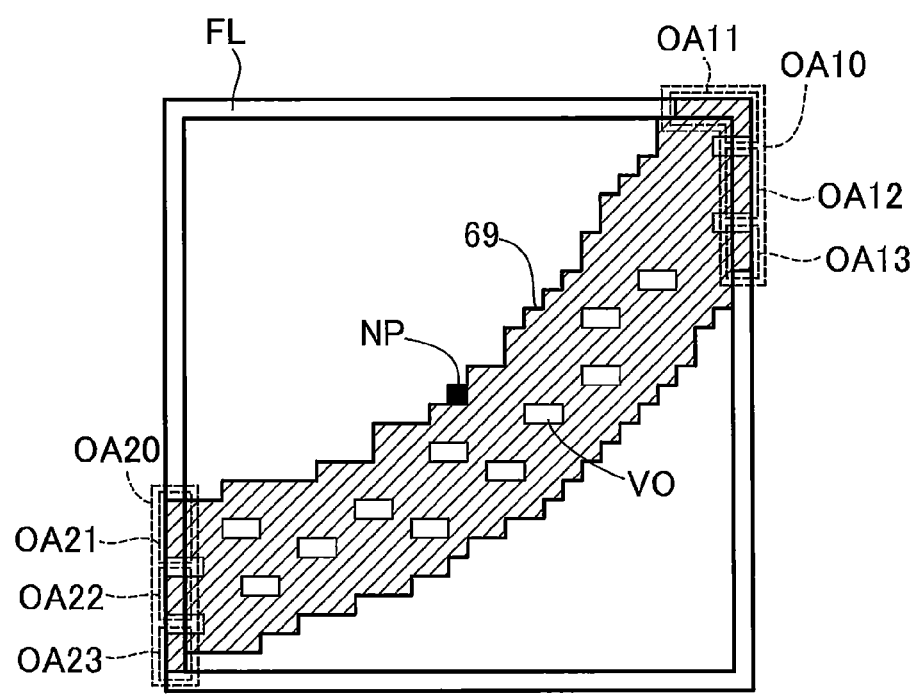
FIG. 13 is an explanatory diagram showing calculation of the intersection number according to a modification of the present invention.

B. Modifications of the Embodiment (1) FIG. 13 is an explanatory diagram showing a variation of the method for calculating the intersection number Mv in the embodiment. FIG. 13 shows a portion of an encircling line 69, and a frame region FL corresponding to a single target pixel NP (red object pixel) constituting the encircling line 69. In some cases, the encircling line 69 may include regions in which color was not deposited because the user drew the encircling line 69 on the original using a special type of writing implement, such as a colored pencil or a water-based pen. The portion of the encircling line 69 in FIG. 13 is part of a binary image that has been produced by performing a thresholding process on the scanned image. In this case, voids VO configured of non-red pixels appear in the encircling line 69.

When calculating the intersection number Mv between a frame region FL and the encircling line 69 (the red object in this case; S315 of FIG. 7), the shape determination unit 350 may not be able to calculate an appropriate intersection number Mv indicating the number of branches in the object when analyzing the partial object images due to the voids VO. In the example of FIG. 13, it is preferable that the intersection number Mv be computed at 2. However, since the frame region FL in effect includes six partial object regions OA11-OA13 and OA21-OA23, the intersection number Mv is calculated to be 6.

For this reason, the shape determination unit 350 may calculate the intersection number Mv while treating a plurality of partial object regions as a single partial object region when the object regions satisfy a prescribed proximity condition. For example, this proximity condition stipulates that the number of non-red pixels existing between the plurality of partial object regions under consideration be no greater than a reference value (2, for example). In the example of FIG. 13, only a single non-red pixel is present between the partial object regions OA11 and OA12 and between the partial object regions OA12 and OA13. Since one pixel is less than the reference value, the shape determination unit 350 determines that the three partial object regions OA11, OA12, and OA13 can be combined as a single partial object region OA10. Similarly, only a single non-red pixel is present between the partial object regions OA21 and OA22 and between the partial object regions OA22 and OA23. Since one pixel is less than the reference value, the shape determination unit 350 determines that the three partial object regions OA21, OA22, and OA23 can be combined as a single partial object region OA20. As a result, the shape determination unit 350 can calculate the intersection number Mv to be a suitable value of "2" (the partial object regions OA10 and OA20).

In this way, when a plurality of individual partial object regions are relatively near each other, it may be more suitable to consider these partial object regions as a single partial object region. In this variation of the embodiment, the shape determination unit 350 can use the proximity condition to calculate a suitable intersection number Mv, thereby more suitably determining whether a red object is an encircling line.

(2) In the first embodiment, a frame region FL is configured such that a corresponding target pixel NP (a single red object pixel) is disposed in the center of a framed rectangular area. However, the frame region FL may instead be configured such that the corresponding target pixel NP is disposed at a position offset from the center of the framed rectangular area. That is, the frame region FL may be set such that the target pixel NP is disposed on the frame region FL itself. Alternatively, the frame region FL may be configured such that the target pixel NP is disposed at a position inside of the frame region FL, but offset from its center.

(3) In the image process of the first embodiment, the following three conditions must be met in order to determine that a red object is an encircling line. (A) The object must be determined to be monochromatic in the monochromatic determination process (S210 and S215 of FIG. 5). (B) The object must be determined to be a line in the line determination process (S220 and S225 of FIG. 5). (C) The object must be determined to have an encircling shape in the shape determination process (S230 and S235 of FIG. 5). However, it is possible to omit one or both of conditions (A) and (B).

(4) In the first embodiment, the size of the frame region FL (the width FW) and the size of the specific region ES (the width EW) are calculated using the equations in FIGS. 8C and 10B, but fixed values may be used for the sizes instead. Further, the frame region FL and specific region ES may have a rectangular or circular shape, rather than a square shape, or may have any of various polygonal shapes, such as a triangular shape or a pentagonal shape.

(5) In the shape determination process of the first embodiment, frame regions FL are set for all red object pixels constituting the target red object, but it is possible to set frame regions FL for only some of the red object pixels. That is, when a frame region FL is set for one red object pixel, other red object pixels positioned within a prescribed distance from the current red object pixel (within a distance of two pixels, for example) may be omitted as targets for setting frame regions FL. Alternatively, it is possible to set frame regions FL for those pixels constituting the target red object that have odd-numbered X and Y coordinates and not to set frame regions FL for all the other red object pixels. In such a case, the ratios RT2, RTC, and RT5 are set to the ratios of first, second, and third specific pixels, respectively, to the number of red object pixels for which frame regions FL were set.

(6) In the first embodiment, the line width LW is identified by calculating the number of consecutive red object pixels in both X- and Y-directions (see FIG. 6A). Alternatively, the line width LW may be identified by calculating the number of consecutive red object pixels in a single direction only.

(7) In the first embodiment, the shape determination unit 350 determines whether the ratio RTC of second specific pixels positioned in the specific region to the total number of second specific pixels is greater than or equal to a reference value by actually setting a specific region ES and calculating the number of second specific pixels positioned therein. However, the shape determination unit 350 may instead calculate a standard deviation σ indicating the variation in positions of a plurality of second specific pixels and may determine that the ratio RTC is greater than or equal to the reference value when the standard deviation σ is no greater than a prescribed threshold value σth, for example. When the standard deviation σ indicating positional variation is no greater than the threshold value σth, then the probability that second specific pixels will be positioned within a distance σth from the average position of second specific pixels (i.e., the center of gravity) is greater than or equal to a prescribed percentage (about 68 percent), assuming that the distribution of second specific pixels follows a normal distribution. Therefore, if the standard deviation σ indicating the variation in position of second specific pixels is no greater than the threshold value σth, then it may be determined that at least a prescribed percentage of second specific pixels will fall within the specific range defined by the center of gravity and the threshold value σth. Variance (the square of σ) may be used in place of standard deviation σ.

(8) While encircling lines in the embodiment are used for specifying objects to be subjected to some image process, such as a removal process, an encircling line may be used to specify the background region by encircling a portion of the background region that includes no objects. In this case, a background removal process may be executed to remove (whiten, for example) the color in the background region indicated by the encircling line, for example.

(9) In addition to scan data produced by a scanner, the target image data in the present invention may be photographic image data captured by a digital camera, or image data generated using an application program for creating text, illustrations, for example. Further, the encircling lines are not limited to those written with a pen, but may be encircling lines drawn over the image using the application program described above, for example. In this case, a mouse or other pointing device may be used to draw the encircling lines, enabling the lines to be identified accurately, even though the lines have been written in freehand.

(10) While the image process unit 300 of the server 400 functions to execute the image process in the first embodiment, this process may be executed by a device other than the server 400, such as the personal computer 500 connected to the multifunction peripheral 200 (see FIG. 1). In order to execute the image process with the personal computer 500, a scanner driver may be installed on the personal computer 500 in order to control the scanning unit 250 of the multifunction peripheral 200 or a standalone scanner (not shown). Alternatively, the image process may be executed with the CPU 210 of the multifunction peripheral 200 or a CPU in the standalone scanner. Further, rather than a device provided in a single enclosure, the server 400 may be configured of a computing system having a plurality of computing devices (for example, a distributed computing system for implementing cloud computing).

(11) Part of the configuration is implemented in hardware in the first embodiment. However, the part of the configuration may be implemented by software. Conversely, part of the configuration implemented in software may be replaced with hardware.

What is claimed is:

1. An image-processing device comprising:
   a processor; and
   a memory storing computer-readable instructions therein, the computer-readable instructions, when executed by the processor, causing the image-processing device to perform:
   identifying an object in a target image represented by target image data, the object comprising a plurality of object pixels representing a first value;
   executing the following steps (A), (B), (C) and (D) for each of the plurality of object pixels included in the object:
      (A) identifying, as a target pixel, each of the plurality of object pixels included in the object, the target pixel being one of the plurality of object pixels representing the first value;
      (B) setting a frame region for the target pixel, the frame region surrounding the target pixel or comprising a plurality of pixels including the target pixel;
      (C) identifying a partial object region corresponding to the target pixel, the partial object region being a part of the frame region and having at least one of the plurality of object pixels representing the first value; and
      (D) counting a number of the partial object regions included in the frame region;
   calculating a ratio of first object pixels to the plurality of object pixels as a first ratio, the number of the partial object regions that correspond to each of the first object pixels being 2;
   judging whether the first ratio is greater than or equal to a first reference value; and
   determining that the object represents an encircling line that encloses a part of the target image if the first ratio is greater than or equal to the first reference value.

2. The image-processing device according to claim 1, wherein the instructions further cause the image-processing device to perform:
   setting a specific region based on positions of a plurality of second object pixels, the number of the partial object regions that correspond to the second object pixel being one of 1, 3, and 4;
   calculating a ratio of second object pixels that are in the specific region to the plurality of second object pixels as a second ratio;
   identifying whether the second ratio is greater than or equal to a second reference value; and
   determining that the object is an encircling line that encloses a part of the target image if the second ratio is greater than or equal to the second reference value.

3. The image-processing device according to claim 1, wherein the instructions further cause the image-processing device to perform:
   calculating a ratio of third object pixels to the plurality of object pixels as a third ratio, the number of the partial object regions that correspond to the third object pixel being greater than or equal to 5;
   identifying whether the third ratio is less than a third reference value; and
   determining that the object is an encircling line that encloses a part of the target image if the third ratio is less than the third reference value.

4. The image-processing device according to claim 1, wherein the instructions further cause the image-processing device to perform setting a specific region based on positions of a plurality of second object pixels, the number of the partial object regions that correspond to the second object pixel being one of 1, 3, and 4; and
   wherein at least one of the specific region and the plurality of frame regions has a size, the size being set as a first number of pixels when the target image data has a first resolution, the size being set as a second number of pixels when the target image data has a second resolution, the first number of pixels being different from the second number of pixels, the first resolution being different from the second resolution.

5. The image-processing device according to claim 1, wherein the instructions further cause the image-processing device to perform setting a specific region based on positions of a plurality of second object pixels, the number of the partial object regions that correspond to the second object pixel being one of 1, 3, and 4; and
   wherein at least one of the plurality of frame regions and the specific region has a size, the size being set as a first size when the object has a first region size, the size being set as a second size when the object has a second region size, the first size being different from the second size, the first region size being different from the second region size.

6. The image-processing device according to claim 1, wherein the instructions further cause the image-processing device to perform:
   setting a specific region based on positions of a plurality of second object pixels, the number of the partial object regions that correspond to the second object pixel being one of 1, 3, and 4; and
   specifying a width of the object based on a number of consecutive pixels included in the object,
   wherein at least one of the plurality of frame regions and the specific region has a size, the size being set as a first region size when the object has a first width, the size being set as a second region size when the object has a second width, the first region size being different from the second region size, the first width being different from the second width.

7. The image-processing device according to claim 6, wherein the instructions further cause the image-processing device to perform:
   setting a plurality of lines extending in a prescribed direction on the object; and
   wherein the width of the object is specified based on the number of the consecutive pixels of the object along each of the plurality of lines.

8. The image-processing device according to claim 1, wherein the number of the partial object regions for each of the plurality of object pixels is counted by:
   defining a first partial object region and a second partial object region that are in the frame region corresponding to each of the plurality of object pixels;
   determining that the first partial object region and the second partial object region are treated as single partial object region to be united when the first partial object region and the second partial object region satisfy a prescribed proximity condition; and
   counting the number of the partial object regions for each of the plurality of object pixels.

9. The image-processing device according to claim 1, wherein the instructions further cause the image-processing device to perform:
   identifying a target object enclosed by the object determined as the encircling line; and
   executing a prescribed image process using partial image data representing a part of the target image including the target object.

10. A non-transitory computer readable storage medium storing a set of program instructions thereon that, when executed by a computer, cause the computer to perform operations comprising:
   identifying an object in a target image represented by target image data, the object comprising a plurality of object pixels representing a first value;
   executing the following steps (A), (B), (C) and (D) for each of the plurality of object pixels included in the object;
      (A) identifying a target pixel included in the object, the target pixel being one of the plurality of object pixels representing the first value;
      (B) setting a frame region for the target pixel, the frame region surrounding the target pixel or comprising a plurality of pixels including the target pixel;
      (C) identifying partial object region corresponding to the target pixel, the partial object region being a part of the frame region and having at least one of the plurality of object pixels representing the first value; and
      (D) counting a number of the partial object regions included in the frame region;
   calculating a ratio of first object pixels to the plurality of object pixels as a first ratio, the number of the partial object regions that correspond to each of the first object pixels being 2;
   judging whether the first ratio is greater than or equal to a first reference value; and
   determining that the object represents an encircling line that encloses a part of the target image if the first ratio is greater than or equal to the first reference value.

* * * * *